(12) United States Patent
Klimke et al.

(10) Patent No.: US 12,435,252 B2
(45) Date of Patent: Oct. 7, 2025

(54) ADHESIVE POLYETHYLENE COMPOSITION

(71) Applicant: BOREALIS AG, Vienna (AT)

(72) Inventors: Katja Klimke, Linz (AT); John Jamieson, Porvoo (FI); Jari-Jussi Ruskeeniemi, Kulloo (FI); Floran Prades, Linz (AT); Noureddine Ajellal, Kulloo (FI); Tua Sundholm, Porvoo (FI); Jouni Purmonen, Kulloo (FI); Angelica Legras, Linz (AT); Andreas Albrecht, Linz (AT)

(73) Assignee: BOREALIS AG, Vienna (AT)

( * ) Notice: Subject to any disclaimer, the term of this patent is extended or adjusted under 35 U.S.C. 154(b) by 180 days.

(21) Appl. No.: 18/005,020

(22) PCT Filed: Jul. 8, 2021

(86) PCT No.: PCT/EP2021/068983
§ 371 (c)(1),
(2) Date: Jan. 10, 2023

(87) PCT Pub. No.: WO2022/013054
PCT Pub. Date: Jan. 20, 2022

(65) Prior Publication Data
US 2023/0250320 A1   Aug. 10, 2023

(30) Foreign Application Priority Data
Jul. 13, 2020 (EP) ..................... 20185451

(51) Int. Cl.
| | | |
|---|---|---|
| C09J 123/08 | (2006.01) | |
| B32B 1/08 | (2006.01) | |
| B32B 7/12 | (2006.01) | |
| B32B 15/085 | (2006.01) | |
| B32B 27/32 | (2006.01) | |
| C08F 210/16 | (2006.01) | |
| C09J 123/26 | (2006.01) | |
| F16L 9/147 | (2006.01) | |
| B32B 15/18 | (2006.01) | |

(52) U.S. Cl.
CPC ........... *C09J 123/0869* (2013.01); *B32B 1/08* (2013.01); *B32B 7/12* (2013.01); *B32B 15/085* (2013.01); *B32B 27/32* (2013.01); *C08F 210/16* (2013.01); *C09J 123/0815* (2013.01); *C09J 123/26* (2013.01); *F16L 9/147* (2013.01); *B32B 15/18* (2013.01); *B32B 2255/06* (2013.01); *B32B 2255/26* (2013.01); *B32B 2270/00* (2013.01); *B32B 2307/748* (2013.01); *B32B 2597/00* (2013.01)

(58) Field of Classification Search
CPC ............ C09J 123/0807; C09J 123/0815; C09J 123/0869; C09J 123/26; C08L 2205/02; C08L 2205/025
See application file for complete search history.

(56) References Cited

U.S. PATENT DOCUMENTS

| | | |
|---|---|---|
| 3,236,917 A | 2/1966 | Giulio et al. |
| 4,639,495 A | 1/1987 | Waggoner |
| 4,950,541 A | 8/1990 | Tabor et al. |
| 4,957,968 A | 9/1990 | Adur et al. |
| 5,001,205 A | 3/1991 | Hoel |
| 5,001,244 A | 3/1991 | Welborn, Jr. |
| 5,194,509 A | 3/1993 | Hasenbein et al. |
| 6,210,765 B1 | 4/2001 | Tanaka et al. |
| 8,207,265 B2 | 6/2012 | Mcgee et al. |
| 2005/0163996 A1 | 7/2005 | Lee et al. |
| 2015/0210902 A1* | 7/2015 | Botros ............ B32B 7/12 428/355 EN |
| 2017/0327677 A1* | 11/2017 | Neuteboom ......... C09D 123/06 |

FOREIGN PATENT DOCUMENTS

| | | |
|---|---|---|
| CN | 102300921 A | 12/2011 |
| CN | 106574156 A | 4/2017 |
| CN | 109575855 A | 4/2019 |
| EA | 018678 B1 | 12/2011 |
| EP | 0678103 B1 | 10/1995 |
| EP | 0688794 B1 | 12/1995 |
| EP | 0721474 A1 | 7/1996 |
| EP | 0769027 A1 | 4/1997 |

(Continued)

OTHER PUBLICATIONS

Anita J. Brandolini, NMR Spectra of Polymers and Polymer Additives, Marcel Dekker, Inc. New York, 2000 pp. 1-660.

(Continued)

*Primary Examiner* — Marc S Zimmer
(74) *Attorney, Agent, or Firm* — Tarolli, Sundheim, Covell & Tummino LLP

(57) ABSTRACT

The present invention relates to an adhesive polyethylene composition comprising (A) from 60 to 90 wt % of a non-elastomeric polyethylene; (B) from 9.0 to 38 wt % of an ethylene based elastomer being a copolymer of ethylene and alpha-olefin comonomer units having from 4 to 12 carbon atoms; wherein onto component (A) or components (A) and (B) an acid grafting agent (C) has been grafted in an amount of from 0.01 to 3.0 wt %, all based on the total weight of the adhesive polyethylene composition, a multi-layer structure comprising said adhesive polyethylene composition and the use of said adhesive polyethylene composition for the production of a multi-layer structure.

14 Claims, 2 Drawing Sheets

(56) References Cited

FOREIGN PATENT DOCUMENTS

| | | |
|---|---|---|
| EP | 0810235 | 2/1998 |
| EP | 1316598 B1 | 6/2003 |
| EP | 1859926 B1 | 11/2007 |
| EP | 3409739 A1 | 12/2018 |
| RU | 2477299 C2 | 3/2013 |
| RU | 2600167 C2 | 10/2016 |
| RU | 2697560 C2 | 8/2019 |
| RU | 2705584 C1 | 11/2019 |
| WO | 87/03604 A1 | 6/1987 |
| WO | 1992/12182 A1 | 7/1992 |
| WO | 93/25590 A1 | 12/1993 |
| WO | 95/09191 A1 | 4/1995 |
| WO | 95/12622 A1 | 5/1995 |
| WO | 96/18662 A1 | 6/1996 |
| WO | 97/28170 A1 | 8/1997 |
| WO | 98/56831 A1 | 12/1998 |
| WO | 98/58001 A1 | 12/1998 |
| WO | 99/51646 A1 | 10/1999 |
| WO | 9965949 A1 | 12/1999 |
| WO | 00/34341 A2 | 6/2000 |
| WO | 00/040620 A1 | 7/2000 |
| WO | 2001/055230 A1 | 8/2001 |
| WO | 2001/055275 A1 | 8/2001 |
| WO | WO-0155275 A1 * | 8/2001 ............ C09J 151/06 |
| WO | 2005/118655 A1 | 12/2005 |
| WO | WO-2008054637 A1 * | 5/2008 ............ B32B 15/08 |
| WO | 2008/089978 A1 | 7/2008 |
| WO | 2015/158790 A1 | 10/2015 |
| WO | 2015/158791 A2 | 10/2015 |
| WO | 2017/108951 A1 | 6/2017 |
| WO | 2017/108969 A1 | 6/2017 |
| WO | 2018/108917 A1 | 6/2018 |
| WO | 2018/108918 A1 | 6/2018 |
| WO | 2018/178151 A1 | 10/2018 |
| WO | 2018/178152 A1 | 10/2018 |
| WO | WO-2020115071 A1 * | 6/2020 ............ C09J 151/06 |

OTHER PUBLICATIONS

Castignolles, et al., "Detection and quantification of branching in polyacrylates by size-exclusion chromatography (SEC) and melt-state 13C NMR spectroscopy" Polymer 5, 2009, 2373-2383.

Christian Jackson, et al. Molecular Weight-Sensitive Detectors for Size Exclusion Chromatography, 2004, pp. 103-144.

Definition of terms relating to the Non-Ultimate Mechanical Properties of Polymers Pure & Appl. Chem. vol. 70, pp. 701-754, 1998.

E-L. Heino, et al., "Rheological Characterization of Polyethylene Fractions" Theoretical and Applied Rheology, Aug. 17-21, 1992, pp. 360-362.

Eeav-Leena Heino, "The Influence of molecular structure on some rheological properties of polyethylene" Annual transactions of the Nordic Rheology Society, vol. 3, 1995.

Gerhard Hubner, Application of Melt-State NMR Spectroscopy for Polyolefin Characterization in Industry, Macromolecules, Chapter 24, 401, 2011.

J. Randall, Macromol. Chem Phys. 1989, C29, 201_NPL.

John M. Griffin, "Low-load rotor-synchronised Hahn-echo pulse train (RS-HEPT) 1H decoupling in solid-state NMR: factors affecting MAS spin-echo dephasing times", Magnetic Reson. Chem. 2007; 45: S198-S208.

Katja Klimke, et al. "Optimisation and Application of Polyolefin Branch Quantification by Melt-State 13C NMR Spectroscopy" Macromol. Chem. Phys. 2006, 207, 382-395.

M. Pollard, et al. "Observation of Chain Branching in Polyethylene in the Solid State and Melt via 13C NMR Spectroscopy and Melt NMR Relaxation Time Measurements" Macromolecules 2004, 37, 813-825.

Matthew Parkinson, et al. "Effect of Branch Length on 13C NMR Relaxation Properties in Molten Poly[ethyleneco-(a-olefin)] Model Systems" Macromol. Chem Phys. 2007, 208, 2128-2133.

Vincent Busico, et al. 1H NMR Analysis of Chain Unsaturations in Ethene/1-Octene Copolymers Prepared with Metallocene Catalysts at High Temperature, Macromolecules 2005, 38, 6988-6996.

Vincent Busico, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.

Weixia Liu, Poly(ethylene-co-1-octene) Characterization by High-Temperature Multidimensional NMR at 750 MHZ, Macromolecules 2001, 34, 4757-4767.

Kenia Filip, et al., "Heteronuclear decoupling under fast MAS by a rotor-synchronized Hahn-echo pulse train" Journal of Magentic Resonance 176, 2005, 239-243.

XiaoHua Qiu, et al., Improved Peak Assignments for the 13C NMR Spectra of Poly(ethylene-co-1-octene)s, Macromolecules 2007, 40, 6879-6884.

Yiyong He, Unexpected proton spin-lattice relaxation in the solutions of polyolefin and tetrachloroethane, Res. Chem, 2010, 48, 537-542.

Zhe Zhou, et al., "A new decoupling method for accurate quantification of polyethylene copolymer composition and triad sequence distribution with 13C NMR" Journal of Magnetic Resonance 187 (2007) 225-233.

EP20185451 European Search Report dated Dec. 9, 2020.

Russian Application No. 2023102785/04, Office Action dated Jul. 12, 2023.

Chinese Application No. 202180049413.7, Office Action dated Apr. 30, 2025.

Common Knowledge Evidence Document Building Materials.

Korean Application No. 10-2023-7004631, Office Action dated Apr. 27, 2025.

* cited by examiner

ADHESIVE POLYETHYLENE COMPOSITION

The present invention relates to an adhesive polyethylene composition, a multi-layer coating comprising one layer comprising said adhesive polyethylene composition and the use of said adhesive polyethylene composition for the production of a multi-layer structure, such as an adhesive layer of a three-layer metal pipe coating, with improved peel strength.

BACKGROUND OF THE INVENTION

Multi-layered structures comprising two, three, four or more layers are known for many applications. In these multi-layer structures different layers most often consist of different materials which accordingly have different physical and chemical properties. This results in the problem that adjacent layers do not or only to an insufficient extent adhere to each other. Therefore, it is commonly known to build up multi-layer structures with intermediate adhesive layers for improving adhesion of adjacent layers consisting of different materials and thus avoid delamination.

One prominent example of multi-layered structures are coatings for metal pipes. Commonly a three-layer coating is provided on the outer surface of metal pipes in order to protect the pipe against mechanical damages and corrosion. A three-layer coating usually consists of an epoxy layer which is designed to firmly adhere to the outer surface of the metal wall of the pipe, an intermediate adhesive layer and an outer polyolefin protective layer which commonly is a high density polyethylene, a cross-linked polyethylene or a polypropylene. The three-layer structure shows improved properties compared to formerly known single-layer coatings. On the one hand, the epoxy layer shows an improved bonding to the metal wall, avoids cathodic disbondment and provides less oxygen penetration whereas on the other hand the outer polyolefin protective layer provides good mechanical protection, and less water penetration. However, in order to avoid delamination of the polyolefin protective layer and the epoxy layer which would result in damage of the multi-layer coating an adhesive layer between both layers is necessary.

Adhesive compositions and processes for producing such adhesive compositions are known from EP 1 316 598 A1. This adhesive composition comprise a blend of a non-elastomeric polyethylene, polymerized in the presence of a single site catalyst, and an elastomer, wherein either the non-elastomeric polyethylene or the blend has been grafted with an acid grafting agent. A coating comprising an adhesive layer comprising said adhesive composition showed good adhesion properties in form of good peel strength.

For three layer pipe coating ISO 21809-1:2011 defines the minimum requirements regarding peel strength of at least 100 N/cm at 23° C. for Class A coatings, at least 150 N/cm at 23° C. for Class B coatings and at least 250 N/cm at 23° C. for Class C coatings and of at least 20 N/cm at 60° C. for Class A coatings, at least 30 N/cm at 80° C. for Class B coatings and at least 40 N/cm at 90° C. for Class C coatings.

Conversion technology in the metal pipe coating market, especially the steel pipe coating market, is changing towards faster line speeds and thicker steel pipes which leads to shorter water cooling times and tend to limit the amount of cooling capacity available to the coating. Currently used adhesive compositions, such as e.g. disclosed in EP 1 316 598 A1 are showing sensitivity to these conditions and frequently do not meet the peel strength requirements.

Thus, there is a need for adhesive compositions suitable for multi-layered structures, such as three-layer metal pipe coatings, which improve the peel strength of coatings which are subjected to shorter water cooling times.

It has surprisingly been found that adhesive compositions comprising a blend of a non-elastomeric polyethylene and an ethylene-based elastomer, which have been grafted with an acid grafting agent, show improved adhesion properties, like improved peel strength also when used in coatings that are subjected to shorter water cooling times.

SUMMARY OF THE INVENTION

The present invention relates to an adhesive polyethylene composition comprising
(A) from 60 to 90 wt % of a non-elastomeric polyethylene;
(B) from 9.0 to 38 wt % of an ethylene based elastomer being a copolymer of ethylene and alpha-olefin comonomer units having from 4 to 12 carbon atoms;
wherein onto component (A) or components (A) and (B) an acid grafting agent (C) has been grafted in an amount of from 0.01 to 3.0 wt %, all based on the total weight of the adhesive polyethylene composition.

Further, the present invention relates to a multi-layer structure comprising one layer comprising the adhesive polyethylene composition as described above or below.

Additionally, the present invention relates to the use of the adhesive polyethylene composition as described above or below for the production of a multi-layer structure.

Definitions

A polyethylene is a polymer, wherein the molar amounts of the monomer units add up to a total amount of at least 50 mol-% ethylene monomer units.

An 'ethylene homopolymer' denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

A polymer is denoted 'ethylene copolymer' if the polymer is derived from ethylene monomer units and at least one alpha-olefin comonomer. The alpha-olefin conomoner preferably is selected from alpha-olefin conomoners with from 4 to 12 carbon atoms, more preferably from 4 to 10 carbon atoms and most preferably from 4 to 8 carbon atoms. Suitable alpha-olefin comonomer species are 1-butene, 1-hexene, 4-methyl-1-pentene, 1-octene or their mixtures. Preferred are 1-hexene and 1-octene. A copolymer of ethylene with 1-octene comonomer units is a polymer comprising, preferably consisting of ethylene monomer units in a major molar amount and comomonomer units of 1-octene in a minor molar amount.

A polymer is denoted 'ethylene terpolymer' if the polymer is derived from ethylene monomer units and two different alpha-olefin comonomer units. A terpolymer of ethylene with 1-butene comonomer units and 1-hexene comonomer units is a polymer comprising, preferably consisting of ethylene monomer units in a major molar amount and comomonomer units of 1-butene and 1-hexene, each in a minor molar amount.

A polymer comprising more than one fraction differing from each other in at least one property, such as weight average molecular weight or comonomer content, is called "multimodal". If the multimodal polymer includes two different fractions, it is called "bimodal" and, correspondingly, if it includes three different fractions, it is called "trimodal". The form of the molecular weight distribution curve, i.e. the appearance of the graph of the polymer weight fraction as function of its molecular weight, of such a multimodal polymer will show two or more maxima depending on the modality or at least be distinctly broadened in comparison with the curves of the individual fractions.

In contrast to a multimodal polymer a unimodal polymer only exhibits a single maximum in the molecular weight distribution curve. A unimodal polymer only includes one polymer fraction which cannot be distinguished by weight average molecular weight or comonomer content.

An elastomer is a polymer with viscoelasticity (i.e., both viscosity and elasticity) and very weak intermolecular forces, and generally low Young's modulus and high failure strain compared with other materials. Elastomers are amorphous polymers maintained above their glass transition temperature.

The ethylene based elastomer according to the invention is characterized by a highly amorphous structure, which translates in a low crystallinity, a low crystallization temperature, a low melting temperature and low density, amongst others. It is preferred that the ethylene based elastomer according to the invention has a density of not more than 900 kg/m$^3$, preferably not more than 885 kg/m$^3$, still more preferably not more than 880 kg/m$^3$, most preferably not more than 875 kg/m$^3$.

The non-elastomeric polyethylene differs from the ethylene based elastomer in a more crystalline structure, which translates in a higher crystallinity, higher crystallization temperature, higher melting temperature and higher density, amongst others. It is preferred that the non-elastomeric polyethylene according to the invention has a density of at least 900 kg/m$^3$, preferably at least 920 kg/m$^3$, most preferably at least 925 kg/m$^3$.

An acid grafting agent is a component comprising an acid based functional group which is grafted onto the backbone of a polymer. Suitable grafting methods include chemical treatment, photo-irradiation or high-energy radiation through which a radical is formed on the polymer backbone. The acid grafting agent then reacts with the radical and forms a bond with the polymeric backbone. Mostly preferred is chemical treatment initiated by an organic peroxide.

Extruders are conveying devices that, according to the working principle of the Archimedean screw, evenly press solid to viscous masses out of a shaping opening under high pressure and high temperature. An extruder basically consists of the screw shaft, also called a screw. It is situated in the so-called barrel. The nominal diameter of the bore of the barrel is equal to the outer diameter of the screw. At the downstream end of the barrel is the shaping outlet opening, usually called die plate. At the downstream end of the barrel is the drive, in most cases an electric motor with gear unit (extruder gear), which ensures the rotation of the screw. The screw itself is generally divided into three sections that perform different tasks. In the downstream area of the barrel is the so-called feeding section. In the feeding section the material to be extruded is fed into the extruder through a hopper ("feeding"). This is followed by the compression section, in which the material is conveyed, melted and compacted. Further downstream within the compression section the material is further compressed by the reduced flight depth of the screw and thus the pressure required for the discharge in the tool is built up. Finally, the discharge section ensures a homogeneous flow of material to the die plate. In the present invention the term "barrel section" encompasses the parts of the barrel which surround the compression section and the discharge section of the screw upstream from the feeding section and downstream from the die plate. The barrel section is heated. The heating of barrel section can independently be controlled in so-called "control zones". In the present invention the so-called "first control zone" represents the first control zone within the barrel section downstream of the feeding zone in which the material, usually components (A) and/or (B) and optionally component (C), starts to melt. The temperature of the first control zone is therefore set to a temperature of above 85° C. to 180° C.

In the following amounts are given in % by weight (wt %) if not stated otherwise.

FIGURES

Non-Elastomeric Polyethylene (A)

Figure 1:
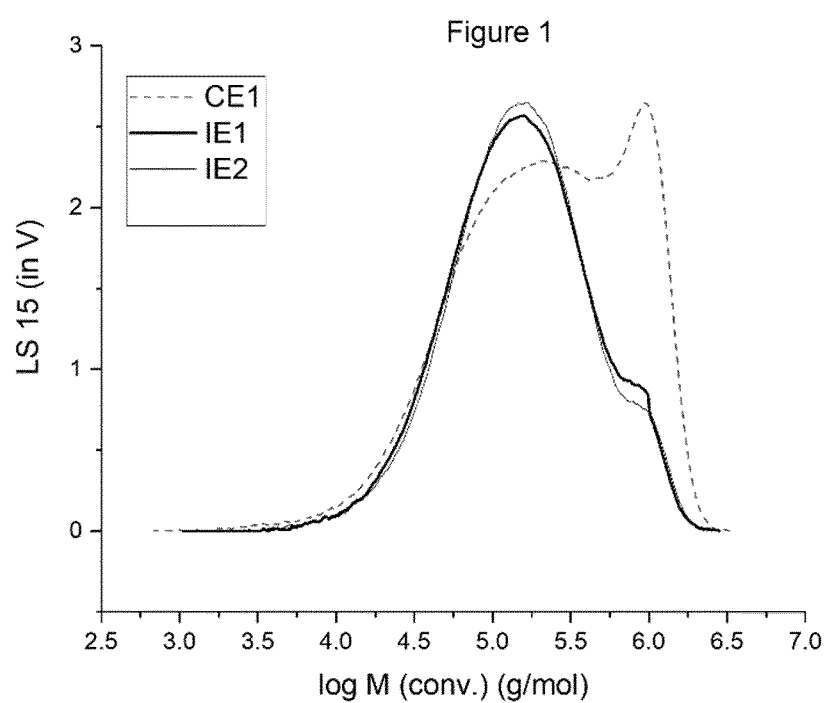
FIG. 1 shows a comparison of the GPC curve in a graph of the normalized LS 15 concentration over the log M of examples CE1, IE1 and IE2.

The non-elastomeric polyethylene (A) is preferably a homopolymer of ethylene or a copolymer of ethylene with one or more alpha-olefin comonomers. It is also possible that non-elastomeric polyethylene (A) is a mixture of a homo- and a copolymer of ethylene. If an ethylene copolymer forms part of non-elastomeric polyethylene (A), preferably the comonomers comprise alpha-olefins having from 3 to 12 carbon atoms, more preferably from 4 to 10 carbon atoms and most preferably from 4 to 8 carbon atoms.

Examples of the alpha-olefin comonomers include, for example, propylene, 1-butene, 1-pentene, 1-hexene, 4-methyl-1-pentene, 1-octene, 1-decene, styrene and mixtures thereof. Particularly preferred comonomers are 1-butene, 1-hexene, 4-methyl-1-pentene and 1-octene. The most preferred alpha-olefin comonomers are 1-butene, 1-hexene and 1-octene.

In one embodiment, the non-elastomeric polyethylene (A) is a copolymer of ethylene and one sort of alpha-olefin comonomer having from 3 to 12 carbon atoms as described above.

In said embodiment it is preferred that, the non-elastomeric polyethylene (A) is a copolymer of ethylene and 1-hexene or a copolymer of ethylene and 1-octene, most preferably a copolymer of ethylene and 1-octene.

Typically, the amount of comonomers within the copolymer is up to 30.0 wt % of the total weight of the copolymer, more preferably is up 10.0 wt % of the total weight of the copolymer and most preferably is up to 6.0 wt % of the total weight of the copolymer.

The lower limit of amount of comonomer within the copolymer is usually 0.5 wt % of the total weight of the copolymer, more preferably is 1.0 wt % of the total weight of the copolymer.

In another embodiment, the non-elastomeric polyethylene (A) is a terpolymer of ethylene with two different alpha-olefin comonomer units selected from alpha-olefins having from 4 to 12 carbon atoms.

"Different" in this context means that the alpha-olefin comonomer units differ in their amount of carbon atoms and consequently in the lengths of the short chain branches in the polymeric chain of the terpolymer.

The two different alpha-olefin comonomer units are preferably selected from 1-butene, 1-hexene, 1-octene 1-decene, most preferably from 1-butene and 1-hexene.

It is therefore especially preferred that the non-elastomeric polyethylene is a terpolymer of ethylene with 1-butene comonomer units and 1-hexene comonomer units.

The terpolymer of ethylene with two different alpha-olefin comonomer units selected from alpha-olefins having from 4 to 12 carbon atoms, preferably 1-butene and 1-hexene, can comprise additional comonomer units selected for alpha olefins different from said two different alpha-olefin comonomer units, such as propylene, 1-pentene, 4-methyl-1-pentene, 1-octene, 1-decene, styrene and mixtures thereof.

It is however, preferred that the terpolymer of ethylene with two different alpha-olefin comonomer units selected from alpha-olefins having from 4 to 12 carbon atoms consists of ethylene and said two different alpha-olefin comonomer units, preferably consists of ethylene, 1-butene and 1-hexene.

Typically, the total amount of comonomer units within the terpolymer is up to 30.0 wt % of the total weight of the copolymer, more preferably is up 10.0 wt % of the total weight of the terpolymer and most preferably is up to 6.0 wt % of the total weight of the terpolymer.

The lower limit of the total amount of comonomer units within the copolymer is usually 0.5 wt % of the total weight of the terpolymer, more preferably is 1.0 wt % of the total weight of the terpolymer.

The amount of the first alpha-olefin comonomer units, preferably 1-butene comonomer units, is preferably within the terpolymer is up to 10.0 wt % of the total weight of the terpolymer, more preferably is up 4.0 wt % of the total weight of the terpolymer and most preferably is up to 1.5 wt % of the total weight of the terpolymer.

The lower limit of the total amount of the first alpha-olefin comonomer units, preferably 1-butene comonomer units, is usually 0.1 wt % of the total weight of the terpolymer, more preferably is 0.3 wt % of the total weight of the terpolymer.

The amount of the second alpha-olefin comonomer units, preferably 1-hexene comonomer units, is preferably within the terpolymer is up to 20.0 wt % of the total weight of the terpolymer, more preferably is up 6.0 wt % of the total weight of the terpolymer and most preferably is up to 4.5 wt % of the total weight of the terpolymer.

The lower limit of the total amount of the second alpha-olefin comonomer units, preferably 1-hexene comonomer units, is usually 0.4 wt % of the total weight of the terpolymer, more preferably is 0.7 wt % of the total weight of the terpolymer.

The non-elastomeric polyethylene (A) is preferably present in the adhesive polyethylene composition in an amount of 60 to 90 wt %, preferably from 65 to 85 wt %, and in particular from 70 to 80 wt % of the total amount of the adhesive polyethylene composition.

Further preferred, the non-elastomeric polyethylene (A) before grafting has a melt flow rate $MFR_2$ of 1.0 to 10.0 g/10 min, more preferably of 3.0 to 8.0 g/10 min. $MFR_2$ is measured according to ISO 1133 at a temperature of 190° C. under a load of 2.16 kg.

The density of the non-elastomeric polyethylene (A) preferably is from 900 to 960 kg/m$^3$, more preferably from 920 to 950 kg/m$^3$, and most preferably from 925 to 945 kg/m$^3$.

Further, the non-elastomeric polyethylene (A) preferably has a polydispersity (PDI-LS), determined as ratio of weight average molecular weight to number average molecular weight, Mw/Mn, of from 1.5 to 6.0, more preferably from 1.7 to 5.5 and most preferably from 1.9 to 5.0, when determined by GPC-VISC-LS analysis.

When polymerized in the presence of a single site catalyst the non-elastomeric polyethylene (A) preferably has a narrower polydispersity (PDI-LS), Mw/Mn, suitably of from 1.5 to 4.0, more preferably from 1.7 to 3.5.

When polymerized in the presence of a Ziegler-Natta catalyst the non-elastomeric polyethylene (A) preferably has a broader polydispersity (PDI), Mw/Mn, suitably of from 2.5 to 6.0, more preferably from 2.7 to 5.5 and most preferably from 3.0 to 5.0.

Still further, the non-elastomeric polyethylene (A) preferably has a weight average molecular weight Mw (LS) of from 35,000 g/mol to 100,000 g/mol, more preferably from 40,000 g/mol to 90,000 g/mol and most preferably from 45,000 g/mol to 80,000 g/mol, when determined by GPC-VISC-LS analysis.

When polymerized in the presence of a single site catalyst the non-elastomeric polyethylene (A) preferably has a lower weight average molecular weight Mw (LS) of from 35,000 g/mol to 85,000 g/mol, more preferably from 40,000 g/mol to 75,000 g/mol and most preferably from 45,000 g/mol to 65,000 g/mol.

When polymerized in the presence of a Ziegler-Natta catalyst the non-elastomeric polyethylene (A) preferably has a higher weight average molecular weight Mw (LS) of from 45,000 g/mol to 100,000 g/mol, more preferably from 55,000 g/mol to 90,000 g/mol and most preferably from 65,000 g/mol to 80,000 g/mol.

Additionally, the non-elastomeric polyethylene (A) preferably has a z average molecular weight Mz (LS) of from 75,000 g/mol to 300,000 g/mol, more preferably from 80,000 g/mol to 275,000 g/mol and most preferably from 85,000 g/mol to 260,000 g/mol, when determined by GPC-VISC-LS analysis.

When polymerized in the presence of a single site catalyst the non-elastomeric polyethylene (A) preferably has a lower z average molecular weight Mz (LS) of from 75,000 g/mol to 200,000 g/mol, more preferably from 80,000 g/mol to 175,000 g/mol and most preferably from 85,000 g/mol to 150,000 g/mol.

When polymerized in the presence of a Ziegler-Natta catalyst the non-elastomeric polyethylene (A) preferably has a higher z average molecular weight Mz (LS) of from 150,000 g/mol to 300,000 g/mol, more preferably from 175,000 g/mol to 275,000 g/mol and most preferably from 200,000 g/mol to 260,000 g/mol Further, the non-elastomeric polyethylene (A) preferably has a shear thinning index $SHI_{1/100}$ of from 0.1 to 10, more preferably from 0.5 to 7.5 and most preferably from 1.0 to 5.0.

Still further, the non-elastomeric polyethylene (A) preferably has a melting temperature Tm of from 115° C. to 140° C., more preferably from 117° C. to 135° C. and most preferably from 120° C. to 130° C.

Additionally, the non-elastomeric polyethylene (A) preferably has a crystallization temperature Tc of from 95° C. to 125° C., more preferably from 100° C. to 120° C. and most preferably from 105° C. to 115° C.

Further, the non-elastomeric polyethylene (A) preferably has a content of vinyl groups/1000 carbon atoms of more than 0.6, such as from 1.0 to 50.0, more preferably from 2.5 to 45.0, most preferably from 5.0 to 40.0, determined by quantitative nuclear-magnetic resonance (NMR) spectroscopy in solution.

When polymerized in the presence of a single site catalyst the non-elastomeric polyethylene (A) preferably has a content of vinyl groups/100,000 carbon atoms of from 1.0 to 20.0, more preferably from 2.5 to 15.0, most preferably from 5.0 to 10.0.

When polymerized in the presence of a Ziegler-Natta catalyst the non-elastomeric polyethylene (A) preferably has a higher content of vinyl groups/100,000 carbon atoms of from 17.5 to 50.0, more preferably from 20.0 to 45.0, most preferably from 25.0 to 40.0.

Still further, the non-elastomeric polyethylene (A) preferably has a total amount of unsaturation/100,000 carbon atoms of from 10.0 to 75.0, more preferably from 12.5 to 60.0, most preferred from 15.0 to 50.0, determined by quantitative nuclear-magnetic resonance (NMR) spectroscopy in solution.

The non-elastomeric polyethylene (A) of the adhesive polyethylene composition can be produced in a process comprising a single site catalyst or a Ziegler-Natta catalyst.

Thereby, the non-elastomeric polyethylene (A) can be produced in a multi-phase polymerization process using e.g. slurry and/or gas phase reactors or in a single-phase polymerization process such as a solution polymerization process.

In one embodiment the non-elastomeric polyethylene (A) is polymerized in a multi-phase polymerization process using a single site catalyst.

Preferably, in said embodiment the non-elastomeric polyethylene (A) is produced in a process comprising a metallocene catalyst. Further preferred, the catalyst comprises a metallocene component on a porous support and an alumoxane component.

Preferred catalysts are those as described in EP 0 678 103, WO 97/28170, WO 98/56831 and/or WO 00/34341.

Preferably the non-elastomeric polyethylene (A) is produced in a process as disclosed in EP 0 678 103 which is characterized in that ethylene is slurry polymerised using a supported olefin polymerisation catalyst prepared by (1) providing a porous support, which is an inorganic oxide of an element chosen from groups 2 to 4 and 13 to 14 of the Periodic Table of Elements, preferably alumina or silica, (2) providing a solution comprising (2.1) the reaction product of (2.1.1) a metallocene of the formula (1)

wherein Cp is an unsubstituted or substituted and/or fused homo- or heterocyclopentadienyl, R is a group of 1-4 atoms connecting two Cp rings, M is a transition metal of group 4, 5 or 6 of the Periodic Table of Elements, preferably zirconium or hafnium, R' is a hydrocarbyl or hydrocarboxyl group having 1-20 carbon atoms, and X is a halogen atom, in which case m=1-3, n=0 or 1, o=0-3, p=0-3 and the sum m+n+p=the same as the state of oxidation of M, and (2.1.2) an alumoxane of the formula (2)

$$R''-(AlO)_xAlR''_2 \quad (2)$$

which formula (II) depicts a linear compound, and/or of the formula (3)

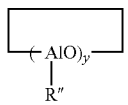

which formula (III) depicts a cyclic compound, and in which formulae (2) and (3) x is 1-40, preferably 10-20, y is 3-40, preferably 3-20, and R'' is an alkyl group having 1-20 carbon atoms and (2.2) a solvent, capable of dissolving said reaction product, (3) impregnating the porous support with a volume of the solution, which does not exceed the total pore volume of the porous support, and (4) recovering the impregnated porous support, the pores of which are filled with said solution.

The preferred embodiments of the catalyst given in EP 0 678 103 are also preferred for the production of non-elastomeric polyethylene (A).

Other preferred single-site catalysts are described in EP 688 794, EP 949 274, WO 95/12622, WO 00/34341 and WO 00/40620. Most preferred is the catalyst as described in WO 95/12622 and its preferred embodiments as described in this document.

In another embodiment the non-elastomeric polyethylene (A) is polymerized in a single-phase polymerization process using a single site catalyst.

Preferably, in said embodiment the non-elastomeric polyethylene (A) is produced in a process comprising a metallocene catalyst.

Thus, the polymerization catalyst system may be a metallocene catalyst as disclosed in WO-A-1993025590, U.S. Pat. No. 5,001,205, WO-A1987003604 and U.S. Pat. No. 5,001,244, or it may be a combination of these. Other suitable catalysts, such as late transition metal catalysts, can also be used.

Preferably, the polymerization catalyst system comprises a metallocene catalyst.

According to an embodiment, the polymerization catalyst system comprises (i) at least one metallocene complex of formula (I)

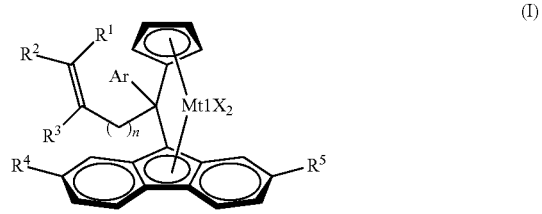

wherein
Mt1 is Hf,
X is a sigma-donor ligand,
R1, R2, R3 are the same or different from each other and can be hydrogen or a saturated linear or branched C1-C10 alkyl, whereby the alkyl group can optionally contain up to 2 heteroatoms belonging to groups 14-16 of the periodic table, or R1 and R2 or R2 and R3 can form a ring having 4 to 6 C-atoms and 1 to 3 double bonds, R4 and R5 are the same or different from each other and can be saturated linear or branched C1-C10 alkyl, C5-C10 aryl, C6-C20 alkylaryl or C6-C20 arylalkyl groups, which can optionally contain up to 2 heteroatoms belonging to groups 14-16 of the periodic table,
n can be 1 to 5,
Ar is a C6-C20-aryl or -heteroaryl group, which can be unsubstituted or substituted by 1 to 5 linear or branched C1-C10 alkyl group(s), and
(ii) an aluminoxane cocatalyst and
(iii) optionally an aluminium alkyl compound Al(R7)3, with R7 being a linear or branched C2-C8-alkyl group.

This kind of catalyst has been described in more detail in document WO 2018/178151 A1, contents of which has been incorporated herein by reference.

According to an embodiment, the polymerization catalyst system comprises
(i) at least one metallocene complex of formula (II)

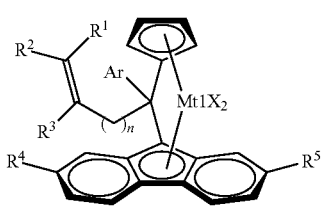

(II)

wherein
Mt1 is Hf,
X is a sigma-donor ligand,
R1, R2, R3 are the same or different from each other and can be hydrogen or a saturated linear or branched C1-C10 alkyl, whereby the alkyl group can optionally contain up to 2 heteroatoms belonging to groups 14-16 of the periodic table, or R1 and R2 or R2 and R3 can form a ring having 4 to 6 C-atoms and 1 to 3 double bonds,
R4 and R5 are the same or different from each other and can be saturated linear or branched C1-C10 alkyl, C5-C10 aryl, C6-C20 alkylaryl or C6-C20 arylalkyl groups, which can optionally contain up to 2 heteroatoms belonging to groups 14-16 of the periodic table,
n can be 1 to 5,
Ar is a C6-C20-aryl or -heteroarylgroup, which can be unsubstituted or substituted by 1 to 5 linear or branched C1-C10 alkyl group(s),
and
(ii) a boron containing cocatalyst.

This kind of catalyst has been described in more detail in document WO 2018/178152 A1, contents of which has been incorporated herein by reference.

According to an embodiment, the polymerization catalyst system comprises
(i) a metallocene complex of formula (III)

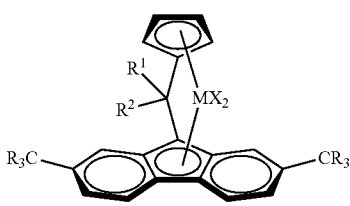

(III)

wherein
M is Hf or a mixture with Zr, provided that more than 50% by moles of the complex of Formula I has M=Hf,
X is a sigma ligand, R are the same or different from each other and can be saturated linear or branched C1-C10 alkyl, C5-C10 aryl, C6-C20 alkylaryl or C6-C20 arylalkyl groups, which can optionally contain up to 2 heteroatoms or silicon atoms,
R1 is a C6-C20-aryl, which can be unsubstituted or substituted by one or up to 5 linear or branched C1-C10 alkyl group(s),
R2 is a saturated linear or cyclic C3-C20 alkyl group or a branched CR3R4R5 group, wherein R3 is hydrogen or a C1-C20 alkyl group and R4 and R5 are the same or are different and can be an C1-C20 alkyl group
and
(ii) a boron containing cocatalyst.

This kind of catalyst has been described in more detail in document WO 2018/108917 A1, contents of which has been incorporated herein by reference.

According to an embodiment, the polymerization catalyst system comprises
(i) a metallocene complex of formula (IV)

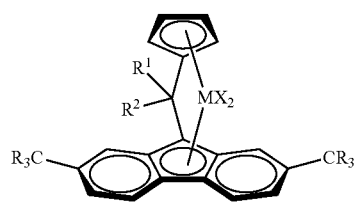

(IV)

wherein
M is Hf or a mixture with Zr, provided that more than 50% by moles of the complex of Formula I has M=Hf
X is a sigma ligand
R are the same or different from each other and can be saturated linear or branched C1-C10 alkyl, C6-C10 aryl, C4-C10 heteroaryl, C6-C20 alkylaryl or C6-C20 arylalkyl groups, which can optionally contain up to 2 heteroatoms or silicon atoms
R1 is a C6-C10 aryl or C6-C20 alkylaryl group optionally containing up to 2 heteroatoms or silicon atoms or a C4-C10 heteroaryl group
R2 is a C4-C20 cycloalkyl group, optionally carrying alkyl substituents in beta-positions, of formula (V)

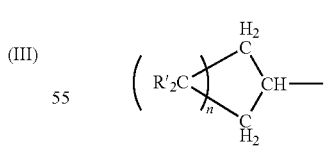

(V)

in which R' can be the same or can be different from each other and can be hydrogen or is defined as R and n is 1 to 17 and
(ii) a boron containing cocatalyst This kind of catalyst has been described in more detail in document WO 2018/108918 A1, contents of which has been incorporated herein by reference.

Other suitable metallocene catalysts have been described in WO 2015/158790 A1 and WO 2015/158791 A1.

In still another embodiment the non-elastomeric polyethylene (A) is polymerized in a multi-phase polymerization process using a Ziegler-Natta catalyst.

Suitable Ziegler-Natta catalysts in said embodiment preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 □m. However, it has turned out that special advantages can be obtained if the support has an average particle size from 15 to 30 µm, preferably from 18 to 25 µm. Alternatively, the support may have an average particle size of from 30 a 80 µm, preferably from 30 to 50 µm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethyl-aluminium, tri-isobutylaluminium, trihexylaluminium and tri-n-octyl-aluminium. Furthermore they include alkylaluminium oxy-compounds, such as methylaluminiumoxane, hexaisobutylaluminiumoxane and tetraisobutyl-aluminiumoxane. Also other aluminium alkyl compounds, such as iso-prenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

In yet another embodiment the non-elastomeric polyethylene (A) is polymerized in a single-phase polymerization process using a Ziegler-Natta catalyst.

Suitable Ziegler-Natta polymerization catalysts in said embodiment may be selected from Ziegler-Natta catalysts as disclosed e.g. in EP 0 721 474 A1 and EP 0 769 027 A1.

When producing the non-elastomeric polyethylene (A) in a multi-phase process in the presence of a single site catalyst or a Ziegler-Natta catalyst as described above, the non-elastomeric polyethylene (A) is preferably is produced in a multi-stage process in a multi-step reaction sequence such as described in WO 92/12182. In this process, in a first step ethylene is polymerized in a loop reactor in the liquid phase of an inert low-boiling hydrocarbon medium. Then, the reaction mixture after polymerisation is discharged from the loop reactor and at least a substantial part of the inert hydrocarbon is separated from the polymer. The polymer is then transferred in a second or further step to one or more gas-phase reactors where the polymerization is continued in the presence of gaseous ethylene. The polymer produced according to this process has a superior homogeneity with respect to the distribution of the different polymer fractions which cannot be obtained e.g. by a polymer mix.

When one sort of comonomer units is copolymerized into the polymeric chain of the non-elastomeric polyethylene (A) the comonomer units can be added to either one of the two reactors or to both reactors.

When two sorts of comonomer units are copolymerized into the polymeric chain of the non-elastomeric polyethylene (A) one sort of comonomer units can be added to the loop reactor and the other sort of comonomer units can be added to the gas phase reactor(s).

In another embodiment both sorts of comonomer units can be added to all reactors.

In yet another embodiment both sorts of comonomer units can be added to only one of the reactors.

When producing the non-elastomeric polyethylene (A) in a single-phase phase process in the presence of a single site catalyst or a Ziegler-Natta catalyst as described above, the non-elastomeric polyethylene (A) is preferably produced in a solution process, for example as disclosed in WO 2017/108951 A1 or WO 2017/108969 A1. Thereby, a solution comprising the catalyst components, ethylene monomer, comonomer and hydrogen is usually introduced to a polymerization reactor operating at a temperature within the range of from 120° C. to 250° C., such as from 140° C. to 220° C., most preferably from 150° C. to 200° C., depending on the content of comonomer units in the polymer, and a pressure within the range of from 50 to 300 bar, preferably from 60 to 250 bar and more preferably from 70 to 200 bar.

The non-elastomeric polyethylene (A) can be a unimodal polyethylene or a multimodal polyethylene.

In one embodiment the non-elastomeric polyethylene (A) can be a multimodal polyethylene. Further preferred, the multimodal polyethylene is a bimodal polyethylene.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilizing reactors coupled in series and using different conditions in each reactor, the different polymer fractions produced in the different reactors will each have their own molecular weight distribution which may considerably differ from one another. The molecular weight distribution curve of the resulting final polymer can be looked at as the Superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182, WO 96/18662, WO 98/58001, WO 99/65949 and WO 2008/089978.

The multimodal polyethylene preferably comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or HMW fraction may comprise only one fraction each or two or more subfractions.

Preferably, the ethylene polymer is a bimodal polymer consisting of one LMW fraction and one HMW fraction.

At least one fraction of the ethylene polymer preferably is a copolymer which was polymerized with one or more comonomer units as defined above. Preferably, the amount of comonomer in the ethylene polymer is 0.02-5.0 mol %, more preferably 0.05-2.0 mol %.

Preferably, the HMW fraction is an ethylene copolymer, preferably copolymerized with one of the above-cited comonomers. Further preferred, the LMW fraction of the polyethylene can be an ethylene homopolymer or an ethylene copolymer, preferably copolymerized with one of the above-cited comonomers.

Further, it is preferred that if the polyethylene (A) is produced according to the above-described multi-stage process the LMW fraction is produced in the loop reactor and the HMW fraction in the gas-phase reactor.

The properties of the multimodal polyethylene can be adjusted by the ratio of the low molecular fraction and the high molecular fraction in the multimodal polyethylene.

In another embodiment the non-elastomeric polyethylene (A) is a unimodal polyethylene.

In this embodiment the unimodal polyethylene, such as the copolymer of ethylene and one or more comonomer units as described above, is usually polymerized in one polymerization reactor.

The unimodal polyethylene can also be polymerized in two or more polymerization reactors using polymerization conditions which allow the polymerization of polyethylene fractions having basically the same properties.

Ethylene-Based Elastomer (B)

The ethylene based elastomer (B) is a copolymer of ethylene a $C_4$-$C_{12}$ alpha-olefin. Suitable $C_4$-$C_{12}$ alpha-olefins include 1-butene, 1-hexene and 1-octene, preferably 1-butene or 1-octene and more preferably 1-octene.

Preferably copolymers of ethylene and 1-octene are used.

The ethylene based elastomer (B) usually does not contain any polar comonomers.

Preferably, the ethylene based elastomer (B) is present in the adhesive polyethylene composition in an amount of 9.0 to 38 wt %, more preferably 15 to 35 wt %, and most preferably 20 to 30 wt %, based on the total amount of the polymer composition.

Suitable ethylene based elastomers (B) have a density in the range of from 840 to 900 kg/m³, preferably in the range of from 845 to 890 kg/m³, more preferably in the range of from 850 to 885 kg/m³, still more preferably in the range of from 852 to 880 kg/m³, most preferably in the range of from 855 to 875 kg/m³.

The $MFR_2$ (ISO 1133; 190° C.; 2.16 kg) of the ethylene based elastomer (B) before grafting is in the range of from 0.5 to 10.0 g/10 min, preferably in the range of from 0.7 to 9.0 g/10 min, more preferably in the range of from 0.9 to 8.0 g/10 min and even more preferably in the range of from 1.0 to 7.5 g/10 min.

The melting points (measured with DSC according to ISO 11357-3) of suitable the ethylene based elastomer (B) are below 130° C., preferably below 120° C., more preferably below 110° C. and most preferably below 100° C.

Furthermore the ethylene based elastomer (B) has a glass transition temperature Tg (measured with DMTA according to ISO 6721-7) of below −35° C., preferably below −40° C., more preferably below −45° C.

The ethylene based elastomer (B) preferably has a comonomer content of from 15 to 45 wt %, more preferably from 20 to 43 wt %, still more preferably of from 25 to 41 wt % and most preferably of from 30 to 40 wt %, based on the total amount of monomer units in the ethylene-based elastomer (B).

The polydispersity (PDI-LS), Mw/Mn of the ethylene based elastomer (B) is most often from 1.0 to 4.5, more preferably from 1.3 to 3.5 and most preferably from 1.5 to 2.5, when determined by GPC-VISC-LS analysis.

Still further, the ethylene based elastomer (B) preferably has a weight average molecular weight Mw (LS) of from 50,000 g/mol to 175,000 g/mol, more preferably from 60,000 g/mol to 160,000 g/mol and most preferably from 65,000 g/mol to 150,000 g/mol, when determined by GPC-VISC-LS analysis.

Additionally, the ethylene based elastomer (B) preferably has a z average molecular weight Mz (LS) of from 75,000 g/mol to 250,000 g/mol, more preferably from 85,000 g/mol to 230,000 g/mol and most preferably from 100,000 g/mol to 215,000 g/mol, when determined by GPC-VISC-LS analysis.

Further, the ethylene based elastomer (B) preferably has a content of vinyl groups/100,000 carbon atoms of from 2.0 to 25.0, more preferably from 3.5 to 20.0, most preferably from 5.0 to 15.0, determined by quantitative nuclear-magnetic resonance (NMR) spectroscopy in solution.

Still further, the ethylene based elastomer (B) preferably has a total amount of unsaturation/100,000 carbon atoms of from 5.0 to 75.0, such as from 6.0 to 72.5, most preferably from 7.5 to 70.0, determined by quantitative nuclear-magnetic resonance (NMR) spectroscopy in solution.

Suitable ethylene based elastomers can be any copolymer of ethylene and $C_4$-$C_{12}$ alpha olefin having the above defined properties, which are commercially available, i.a. from Borealis under the tradename Queo, from DOW under the tradename Engage or Affinity, or from Mitsui under the tradename Tafmer.

Thereby, Queo ethylene based elastomers usually differ from Engage ethylene based elastomers in their significantly higher contents of vinyl groups/100,000 carbon atoms and total amount of unsaturation/100,000 carbon atoms.

Alternately these ethylene based elastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based elastomers are prepared by a one stage or two stage solution polymerization process, especially by high temperature solution polymerization process at temperatures higher than 100° C.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

A known solution technology suitable for the process according to the invention is the COMPACT technology.

Acid Grafting Agent (C)

As acid grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic or non-metallic). Preferably, the unsaturated group is in conjugation with the carboxylic group.

Examples of such grafting agents include acrylic acid, methacrylic acid, fumaric acid, maleic acid, nadic acid, citraconic acid, itaconic acid, crotonic acid, and their anhydrides, metal salts, esters amides or imides.

The preferred grafting agents are maleic acid its derivatives such as maleic anhydride, and in particular maleic anhydride.

Preferably, the acid grafting agent (C) is present in the adhesive polyethylene composition in an amount of 0.01 to 3.0 wt %, more preferably 0.03 to 1.5 wt %, and most preferably 0.05 to 1.0 wt %, based on the total amount of the adhesive polyethylene composition.

Component (D)

Grafting may be carried out in the presence or absence of a radical initiator (D) but is preferably carried out in the presence of a radical initiator (D) such as an organic peroxide, organic perester or organic hydroperoxide.

Mostly preferred the radical initiator (D) is selected from organic peroxides.

Preferably the radical initiator (D), more preferably the organic peroxide, is dissolved in a solvent before being fed into the feeding zone of the extruder.

A suitable organic peroxide can be selected from dialkyl peroxides such as e.g. lauroyl peroxide, didecanoyl peroxide, tert-butylcumylperoxide, 2,5-bis(2-ethylhexanoylperoxy)-2,5-dimethylhexane, 2,5-bis(tert-butylperoxy)-2,5-dimethylhexane, tert-butylcumylperoxide, tert-butylperoxypivalate, di(tert-butylperoxyisopropyl)benzene and mixtures thereof, preferably 2,5-bis(2-ethylhexanoylperoxy)-2,5-dimethylhexane, 2,5-bis(tert-butylperoxy)-2,5-dimethylhexane, di(tert-butylperoxyisopropyl)benzene and mixtures thereof. Solid radical initiators (D) can be dissolved in a solvent, such as isododecane.

The amount of radical initiator is preferably 0 wt % to 0.50 wt %, more preferably 0.001 wt % to 0.40 wt %, and most preferably 0.01 wt % to 0.25 wt %, based on the total amount of the adhesive polyethylene composition.

Additives

The adhesive polyethylene composition can comprise further additives.

Suitable additives are the usual additives for utilization with polyolefins, such as stabilizers (e.g. antioxidant agents), metal scavengers and/or UV-stabilizers, antistatic agents and utilization agents (such as processing aid agents). The additives are preferably selected as not being able to react with the radical initiator (D) under the conditions of the process for preparing the adhesive polyethylene composition of the invention as described above or below.

The amount of additives is preferably 0 wt % to 1 wt %, more preferably 0.001 wt % to 0.8 wt %, based on the total amount of the adhesive polyethylene composition.

Grafting Process

The adhesive polyethylene composition as described above or below is prepared by grafting the acid grafting agent (C) onto component (A) or both components (A) and (B).

Grafting can be carried out by any process known in the art such as grafting in a melt without a solvent or in solution or dispersion or in a fluidised bed. Typically, grafting is performed in a heated extruder or mixer as e.g. described in U.S. Pat. No. 3,236,917 A, 4,639,495 A, 4,950,541 A or 5,194,509 A. The contents of these documents are herein included by reference. Typically, grafting is carried out in a twin screw extruder such as described in U.S. Pat. No. 4,950,541 A.

Preferably the adhesive polyethylene composition as defined above or below is obtainable by a process for producing the adhesive polyethylene composition as described above or below comprising the steps of feeding components (A), (B) and (C) into an extruder;
compounding the components (A) and (B) in the extruder in order to form the adhesive polyethylene composition; and
grafting component (A) or components (A) and (B) with component (C) during the compounding step.

The extruder preferably comprises a feeding section, a barrel section and a die plate, wherein the barrel section of the extruder downstream of the feeding section and upstream of the die plate is divided into a plurality of control zones, and the first control zone represents the first control zone within the barrel section downstream of the feeding zone in which the fed component(s) (A) and/or (B) start(s) to melt.

The components (A), (B) and (C) are preferably fed together into the feeding section of the extruder.

Preferably, components (A), (B) and (C) are blended to form a blend of components (A), (B) and (C). Said blend is the feed into the feeding section of the extruder.

It is preferred that the components (A), (B) and (C), preferably the blend of components (A), (B) and (C), are fed into the feeding section of the extruder through the hopper.

Alternatively, the components (A) and (B) are preferably fed into the feeding section of the extruder. Component (C) then can also be fed into the feeding section but also into the barrel section, preferably into a control zone of the barrel section set to a temperature of 180° C. or lower.

It is preferred that components (A) and (B) are fed into the feeding section of the extruder and component (C) is fed into the barrel section, preferably a control zone of the barrel section set to a temperature of 180° C. or lower.

Optionally further additives as described above or below can be fed into the extruder. Preferably, the further additives are fed into the barrel section of the extruder. These further additives or other polymer components can also fed together with the component (C) into a control zone of the barrel section set to a temperature 180° C. or lower. It is, however, preferred that these further additives or other polymer components are fed into one of the downstream control zones of the barrel section of the extruder, preferably into a control zone of the barrel section set to a temperature of more than 180° C.

The temperature in the feeding section is preferably below 100° C., such as from 20° C. to 70° C., more preferably from 20° C. to 60° C., even more preferably from 25° C. to 60° C., still more preferably from 30° C. to 60° C. and most preferably from 35° C. to 50° C.

It is preferred that the grafting reaction is initiated by feeding a radical initiator (D) into the extruder. The radical initiator (D) can be fed into the feeding section of the extruder separately from components (A), (B) and (C), such as through a side feeder. The radical initiator (D) can also be fed into barrel section of the extruder, such as together with component (C), such as into a control zone set to a temperature of 180° C. or lower.

The extruder preferably is a twin screw extruder, more preferably a co-rotating twin screw extruder.

The extruder may be e.g. any conventionally used extruder. As an example of an extruder for the present compounding step may be those supplied by Japan Steel works or Coperion, e.g. the ZSK co-rotating twin screw extruders with different screw diameters.

The extruder suitable for the process of the present invention can be a laboratory scale extruder or a commercial scale extruder.

In a laboratory scale extruder, the extrusion step is typically carried out using feed rates of 1 kg/h to 100 kg/h, more preferably 5 kg/h to 50 kg/h. In a commercial scale extruder, the throughput is typically from 1 to 50 tons/h, more preferably from 1.5 to 10 tons/h.

The screw speed of the extruder is preferably 170 rpm to 550 rpm, more preferably 200 rpm to 500 rpm.

Preferably, in said extrusion step the SEI (specific energy input) of the extruder may be 150 kWh/ton to 350 kWh/ton, more preferably 170 kWh/ton to 300 kWh/ton, whereby the SEI is directly calculated from the electric input of the extruder ignoring the intrinsically limited effectiveness.

The extruder temperature at the die plate is preferably in the range of from 180° C. to 250° C., more preferably from 185° C. to 230° C., most preferably from 195° C. to 230° C.

The barrel section of the extruder preferably comprises at least 5 control zones in each of which the temperature is independently controlled. Suitably the barrel section comprises from 5 to 15 control zones, preferably from 6 to 12 control zones.

The temperature profile in the barrel section can be adjusted in two different embodiments, which usually leads to a different grafting pattern of the adhesive polyethylene composition, depending on the needs.

In the first embodiment the temperature of the second to the last control zone in the barrel section is maintained constant over all of these control zones with a total deviation of not more than 20° C., preferably not more than more than 15° C., most preferably not more than 10° C. (constant temperature profile).

The temperature of the first control zone of the barrel section downstream of the feeding zone can be lower or in the same range as the temperature of the second to the last control zone in the barrel section.

The temperature of the first control zone is preferably in the range of from 165° C. to 210° C., preferably from 170° C. to 200° C. and most preferably from 175° C. to 190° C.

The temperature of the second to the last control zone in the barrel section is preferably in the range of from 180° C. to 250° C., more preferably from 185° C. to 230° C., most preferably from 195° C. to 230° C.

In the second embodiment the temperature of the control zones of the barrel section from the first control zone of the barrel section downstream the feeding section to the control zone in the middle of the barrel section is increased over the length of the barrel section in 2 or more steps (increased temperature profile).

This means that for a barrel section which comprises 5 or 6 control zones the temperature of control zones 1-3 is increased.

For a barrel section which comprises 7 or 8 control zones the temperature of control zones 1-4 is increased.

For a barrel section which comprises 9 or 10 control zones the temperature of control zones 1-5 is increased.

For a barrel section which comprises 11 or 12 control zones the temperature of control zones 1-6 is increased.

For a barrel section which comprises 13 or 14 control zones the temperature of control zones 1-7 is increased.

For a barrel section which comprises 15 control zones the temperature of control zones 1-8 is increased.

The temperature increase in two or more steps means that over the length of the barrel section from the first control zone of the barrel section downstream the feeding section to the control zone in the middle of the barrel section the temperature of two or more barrels, such as two barrels to five barrel, preferably of two barrels or three barrels, most preferably of two barrels, is set to a higher temperature than the temperature of the barrel upstream of said two or more barrels.

The temperature of the control zones of the barrel section from the first control zone of the barrel section downstream the feeding section to the control zone in the middle of the barrel section is typically increased in two steps to five steps, such as two steps, three steps, four steps or five steps, preferably two to four steps and more preferably two or three steps. In most extruder arrangements two steps of temperature increase are sufficient for the process as described above or below.

The temperature increase of said two or more steps of increasing temperature is preferably in the range of 5° C. to 30° C., more preferably of 7.5° C. to 25° C., most preferably of 10° C. to 20° C. for each step independently.

The temperature of the control zones of the barrel section from the first control zone of the barrel section downstream the feeding section to the control zone in the middle of the barrel section is increased in two or more steps so that the temperature of the control zone in the middle of the barrel section is from 105% to 145%, more preferably from 110% to 140% and most preferably from 110% to 135% of the temperature in the first control zone of the barrel section downstream of the feeding section.

The temperature of the first control zone of the barrel section downstream of the feeding section is in the range of from higher than 85° C. to 180° C., preferably from 120° C.

to 180° C., more preferably from 130° C. to 175° C., and most preferably from 140° C. to 170° C.

The temperature of the control zone in the middle of the barrel section is preferably from 15° C. to 60° C. higher, more preferably from 20° C. to 40° C. than the temperature in the first control zone of the barrel section.

It is preferred that the temperature of the control zones is increased from the first control zone of the barrel section to the control zone in the middle of the barrel section by increments of 5 to 20° C. from control zone to adjacent control zone.

The temperature of the control zones of the barrel section from the control zone in the middle of the barrel section to the control zone of the barrel section directly upstream of the die plate in maintained at the same temperature or increased to a temperature of not more than 120%, more preferably not more than 115%, still more preferably not more than 110% of the temperature of the control zone in the middle of the barrel section.

This means that for a barrel section which comprises 5 or 6 control zones the temperature of control zones 3 to 5 or 6 is maintained at the same temperature or increased to a temperature of not more than 120% than of the temperature of the control zone 3.

For a barrel section which comprises 7 or 8 control zones the temperature of control zones 4 to 7 or 8 is maintained at the same temperature or increased to a temperature of not more than 120% of the temperature of the control zone 4.

For a barrel section which comprises 9 or 10 control zones the temperature of control zones 5 to 9 or 10 is maintained at the same temperature or increased to a temperature of not more than 120% of the temperature of the control zone 5.

For a barrel section which comprises 11 or 12 control zones the temperature of control zones 6 to 11 or 12 is maintained at the same temperature or increased to a temperature of not more than 120% of the temperature of the control zone 5.

For a barrel section which comprises 13 or 14 control zones the temperature of control zones 7 to 13 or 14 is maintained at the same temperature or increased to a temperature of not more than 120% of the temperature of the control zone 5.

For a barrel section which comprises 15 control zones the temperature of control zones 8 to is maintained at the same temperature or increased to a temperature of not more than 120% of the temperature of the control zone 5.

When increased the temperature of the last control zone of the barrel section is preferably from 5° C. to 30° C. higher, more preferably from 10° C. to 20° C. than the temperature in the control zone in the middle of the barrel section.

When maintained the temperature of the last control zone of the barrel section is the same as the temperature in the control zone in the middle of the barrel section.

From the first to the last control zone of the barrel section the temperature is preferably increased by 115% to 150%, more preferably from 120% to 145% and most preferably from 125% to 135% of the temperature of the first control zone of the barrel section.

The temperature of the last control zone of the barrel section is preferably from 30° C. to 75° C., more preferably from 35° C. to 70° C. and most preferably from 40° C. to 60° C. higher than the temperature of the first control zone of the barrel section.

The temperature of the last control zone of the barrel section can be the same as the temperature of the die plate.

In one especially preferred embodiment the barrel section has 6 control zones in which the temperature is independently controlled.

The feeding zone is preferably set to 35° C. to 50° C.
Control zone 1 is preferably set to 140° C. to 170° C.
Control zone 2 is preferably set to 170° C. to 180° C.
Control zone 3 is preferably set to 180° C. to 190° C.
Control zone 4 is preferably set to 190° C. to 200° C.
Control zone 5 is preferably set to 190° C. to 210° C.
Control zone 6 is preferably set to 190° C. to 210° C.
The die plate is preferably set to 190° C. to 210° C.

The measured temperature in the control zones of all embodiments as discussed above may differ from the set temperatures by ±5° C., preferably ±4° C.

Adhesive Polyethylene Composition

The adhesive polyethylene composition comprises the non-elastomeric polyethylene (A) and the ethylene based elastomer (B) onto which the acid grafting agent (C) has been grafted as described above or below. Components (A), (B) and (C) of the adhesive polyethylene composition are preferably as defined above or below.

The adhesive polyethylene composition can further comprise additives as defined above or below.

In one embodiment the adhesive polyethylene composition comprises the copolymer of ethylene with one sort of comonomer units selected from alpha-olefins having from 3 to 12 carbon atoms and the ethylene based elastomer (B) onto which the acid grafting agent (C) has been grafted using the constant temperature profile.

In another embodiment the adhesive polyethylene composition comprises the copolymer of ethylene with one sort of comonomer units selected from alpha-olefins having from 3 to 12 carbon atoms and the ethylene based elastomer (B) onto which the acid grafting agent (C) has been grafted using the increased temperature profile.

In still another embodiment the adhesive polyethylene composition comprises the terpolymer of ethylene with two different comonomer units selected from alpha-olefins having from 4 to 12 carbon atoms and the ethylene based elastomer (B) onto which the acid grafting agent (C) has been grafted using the constant temperature profile.

In yet another embodiment the adhesive polyethylene composition comprises the terpolymer of ethylene with two different comonomer units selected from alpha-olefins having from 4 to 12 carbon atoms and the ethylene based elastomer (B) onto which the acid grafting agent (C) has been grafted using the increased temperature profile.

The adhesive polyethylene composition preferably has a $MFR_2$ value of the final composition (after grafting) of 0.1 to 10.0 g/10 min, more preferably 0.8 to 6.0 g/10 min, and most preferably 1.0 to 5.0 g/10 min.

The adhesive polyethylene composition preferably has a density of from 900 to 950 kg/m$^3$, more preferably from 905 to 940 kg/m$^3$, and most preferably from 910 to 935 kg/m$^3$.

Further, the adhesive polyethylene composition preferably has a melting temperature Tm of from 110 to 150° C., more preferably from 115 to 135° C., most preferably from 120 to 130° C. The heat of fusion Hf is preferably in the range of from 90 to 125 J/g, more preferably from 95 to 120 J/g, most preferably from 100 to 115 J/g.

Still further, the adhesive polyethylene composition preferably has a crystallization temperature Tc of from 90 to 130° C., more preferably from 95 to 120° C., most preferably from 100 to 115° C.

The heat of crystallization Hc is preferably in the range of from 95 to 130 J/g, more preferably from 100 to 125 J/g, most preferably from 105 to 120 J/g.

Further, the adhesive polyethylene composition preferably has a glass transition temperature of from −30.0° C. to −65.0° C., more preferably from −45.0° C. to −60.0° C. and most preferably from −47.5° C. to −57.5° C., when measured using Dynamic Mechanical Thermal Analysis (DMTA) measurement.

Still further, the adhesive polyethylene composition preferably has a storage modulus at 23° C. of from 125 to 250 MPa, more preferably from 140 to 225 MPa, most preferably from 160 to 210 MPa, when measured using Dynamic Mechanical Thermal Analysis (DMTA) measurement.

Further, the adhesive polyethylene composition preferably has rheological polydispersity index PI of not more than 2.25, such as in the range of from 0.40 to 2.10, more preferably in the range of from 0.50 to 2.00, most preferably in the range of from 0.60 to 1.90.

The adhesive polyethylene composition preferably has a shear thinning index $SHI_{1/100}$ of not more than 22.0, such as from 4.0 to 20.0, more preferably from 5.5 to 18.5 and most preferably from 7.5 to 17.5.

Still further, the adhesive polyethylene composition preferably has an elasticity index at a loss modulus G"=0.5 kPa EI(0.5 kPa) of from 75 to 320 Pa, more preferably from 85 to 275 Pa, most preferably from 95 to 250 Pa.

Further, the adhesive polyethylene composition preferably has an elasticity index at a loss modulus G"=2 kPa EI(2 kPa) of from 500 to 1500 Pa, more preferably from 650 to 1350 Pa, most preferably from 750 to 1200 Pa.

Still further, the adhesive polyethylene composition preferably has an elasticity index at a loss modulus G"=5 kPa EI(5 kPa) of from 1750 to 4000 Pa, more preferably from 2000 to 3500 Pa, most preferably from 2200 to 3250 Pa.

The adhesive polyethylene composition preferably has a z average molecular weight Mz (LS) of from 125,000 g/mol to 750,000 g/mol, more preferably from 140,000 g/mol to 700,000 g/mol, still more preferably from 150,000 g/mol to 650,000 g/mol and most preferably from 160,000 to 600,000 g/mol, when determined by GPC-VISC-LS analysis.

Further, the adhesive polyethylene composition preferably has a weight average molecular weight Mw (LS) of from 50,000 to 175,000 g/mol, more preferably from 60,000 to 150,000 g/mol and most preferably from 70,000 to 125,000 g/mol, when determined by GPC-VISC-LS analysis.

The polydispersity index (PDI-LS), being the ratio Mw/Mn, of the adhesive polyethylene composition is preferably in the range of from 1.5 to 4.5, more preferably from 2.0 to 4.3 and most preferably from 2.5 to 4.0, when determined by GPC-VISC-LS analysis.

The adhesive polyethylene composition preferably has only one distinct peak in the GPC curve. Thereby, the GPC curve is defined below in the measurement methods as the concentration normalized LS 15 signal along the molecular weight of conventional GPC, obtained from the GPC-VISC-LS analysis.

The adhesive polyethylene composition can have a cumulative fraction of the light scattering signal of the LS 15° angle above 1 million g/mol (CFLS-1M) in the range of from 0 to 17.5, preferably from 0 to 15.0 and most preferably from 0 to 12.5.

The adhesive polyethylene composition can have a cumulative fraction of the light scattering signal of the LS 15° angle above 2 million g/mol (CFLS-2M) in the range of from 0 to 10.0, preferably from 0 to 8.5 and most preferably from 0 to 7.5.

The adhesive polyethylene composition can have a cumulative fraction of the light scattering signal of the LS 15° angle above 3 million g/mol (CFLS-3M) in the range of from 0 to 8.0, preferably from 0 to 6.5 and most preferably from 0 to 5.0.

Preferably, the adhesive polyethylene composition has a content of vinyl groups/1000 carbon atoms of from 1.0 to 30.0, more preferably from 2.0 to 27.5, still more preferably from 2.5 to 25.0, most preferably from 3.0 to 22.5, determined by quantitative nuclear-magnetic resonance (NMR) spectroscopy in solution.

Further, the adhesive polyethylene composition preferably has a total amount of unsaturations/1000 carbon atoms of from 10.0 to 75.0, more preferably from 12.5 to 60.0, most preferably from 15.0 to 50.0, determined by quantitative nuclear-magnetic resonance (NMR) spectroscopy in solution.

The adhesive polyethylene composition according to the present invention as described above or below is especially suitable for the production of an adhesive layer in multi-layered structures such as e.g. a three-layer coating of a metal pipe, such as a steel pipe.

Multi-Layer Structure

Further, the present invention relates to a multi-layer structure comprising one layer comprising the adhesive polyethylene composition as defined above or below.

Preferably, the multi-layer structure is a pipe coating such as a three-layer coating of a metal pipe. Mostly preferred the multi-layer structure is a three-layer coating of a steel pipe.

The layer comprising the adhesive polyethylene composition as defined above or below preferably is an adhesive layer.

It is preferred that the multi-layer structure, more preferably the coated metal pipe, most preferably the coated steel pipe, has a peel strength at 23° C. of at least 350 N/cm, more preferably of at least 400 N/cm and most preferably of at least 420 N/cm.

The upper limit of the peel strength at 23° C. is usually not higher than 850 N/cm.

Further, the multi-layer structure, more preferably the coated metal pipe, most preferably the coated steel pipe, has a peel strength at 80° C. of at least 60 N/cm, more preferably of at least 63 N/cm and most preferably of at least 65 N/cm.

The upper limit of the peel strength at 80° C. is usually not higher than 350 N/cm.

In one embodiment the adhesive polyethylene composition comprises the copolymer of ethylene with one sort of comonomer units selected from alpha-olefins having from 3 to 12 carbon atoms and the ethylene based elastomer (B) onto which the acid grafting agent (C) has been grafted using the constant temperature profile.

In said embodiment the multi-layer structure, more preferably the coated metal pipe, most preferably the coated steel pipe, preferably has a peel strength at 23° C. of at least 375 N/cm, more preferably of at least 425 N/cm and most preferably of at least 450 N/cm.

The upper limit of the peel strength at 23° C. is usually not higher than 650 N/cm.

Further, the multi-layer structure, more preferably the coated metal pipe, most preferably the coated steel pipe, has a peel strength at 80° C. of at least 60 N/cm, more preferably of at least 63 N/cm and most preferably of at least 65 N/cm.

The upper limit of the peel strength at 80° C. is usually not higher than 200 N/cm.

In another embodiment the adhesive polyethylene composition comprises the copolymer of ethylene with one sort of comonomer units selected from alpha-olefins having from 3 to 12 carbon atoms and the ethylene based elastomer (B)

onto which the acid grafting agent (C) has been grafted using the increased temperature profile.

In said embodiment the multi-layer structure, more preferably the coated metal pipe, most preferably the coated steel pipe, preferably has a peel strength at 23° C. of at least 350 N/cm, more preferably of at least 400 N/cm and most preferably of at least 420 N/cm.

The upper limit of the peel strength at 23° C. is usually not higher than 550 N/cm.

Further, the multi-layer structure, more preferably the coated metal pipe, most preferably the coated steel pipe, has a peel strength at 80° C. of at least 100 N/cm, more preferably of at least 125 N/cm and most preferably of at least 150 N/cm.

The upper limit of the peel strength at 80° C. is usually not higher than 350 N/cm.

In still another embodiment the adhesive polyethylene composition comprises the terpolymer of ethylene with two different comonomer units selected from alpha-olefins having from 4 to 12 carbon atoms and the ethylene based elastomer (B) onto which the acid grafting agent (C) has been grafted using the constant temperature profile.

In said embodiment the multi-layer structure, more preferably the coated metal pipe, most preferably the coated steel pipe, preferably has a peel strength at 23° C. of at least 400 N/cm, more preferably of at least 450 N/cm and most preferably of at least 500 N/cm.

The upper limit of the peel strength at 23° C. is usually not higher than 850 N/cm.

Further, the multi-layer structure, more preferably the coated metal pipe, most preferably the coated steel pipe, has a peel strength at 80° C. of at least 75 N/cm, more preferably of at least 85 N/cm and most preferably of at least 95 N/cm.

The upper limit of the peel strength at 80° C. is usually not higher than 300 N/cm.

In yet another embodiment the adhesive polyethylene composition comprises the terpolymer of ethylene with two different comonomer units selected from alpha-olefins having from 4 to 12 carbon atoms and the ethylene based elastomer (B) onto which the acid grafting agent (C) has been grafted using the increased temperature profile.

In said embodiment the multi-layer structure, more preferably the coated metal pipe, most preferably the coated steel pipe, preferably has a peel strength at 23° C. of at least 400 N/cm, more preferably of at least 450 N/cm and most preferably of at least 500 N/cm.

The upper limit of the peel strength at 23° C. is usually not higher than 850 N/cm.

Further, the multi-layer structure, more preferably the coated metal pipe, most preferably the coated steel pipe, has a peel strength at 80° C. of at least 100 N/cm, more preferably of at least 125 N/cm and most preferably of at least 150 N/cm.

The upper limit of the peel strength at 80° C. is usually not higher than 350 N/cm.

Preferably, multi-layer structure, more preferably the coated metal pipe, most preferably the coated steel pipe has a peel strength in the claimed range independent from the cooling procedure of the multi-layered structure or coated pipe, i.e. at conventional cooling rates and at faster cooling rates.

Pipes, preferably metallic pipes and most preferably steel-pipes are coated with a three-layer coating usually according to the following procedure:

It is preferable to properly prepare the surface of the pipe before coating as it is known in the art. The pipe surface is typically inspected for any rust, dirt, flaws, discontinuities, and metal defects. All the excess material needs be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

Typically the pipes are heated with induction heating up to about 200° C. to 220° C. The temperature is adjustable depending on the line speed and the material being used in the corrosion preventing layer. When the epoxy Teknos Infralit EP8054 is used the steel pipe is preferably heated to 190° C. The temperature decreases slightly during the coating process. If epoxy powder (at 23° C.) is used it is typically sprayed on with epoxy guns, where the speed of the rotating pipe is about 9 m/min. The thickness of the epoxy and other coating materials are set in accordance with end use specified requirements. Normal thickness value for the epoxy layer (on-shore installations) is from 70 to 200 µm, such as 135 to 160 µm.

Materials that may be used in the corrosion protection layer are, for instance, epoxy resins and organosilicon compounds. Examples of suitable epoxy resins are phenol-based epoxies and amine-based epoxies. These kinds of epoxies are sold, among others, under trade names of Infralit EP8054 (of Teknos), Scotchkote 6233P (of 3M) and PE50-7191 (of BASF). Suitable organosilicon compounds have been disclosed in EP-A-1859926.

The extrusion of the adhesive layer and the top-coating layer may be performed, for instance, with two single screw extruders. They may have a diameter of, for instance, from 30 to 100 mm, such as 60 mm, and a length of from 15 to 50 L/D, such as 30 L/D. The temperature is typically controlled in several zones and the temperature of the PE adhesive and coating layer after the die is from 190 to 300° C., such as 210° C. to 250° C., respectively. Die widths are from 50 to 300 mm, such as 80 mm and 200 mm for the adhesive layer and coating layer, respectively. Both adhesive layer and the coating layer are usually rolled tightly onto the pipe with a silicone pressure roller. The thickness of the adhesive layer is typically from 200 to 600 µm, such as 250 to 500 µm. The thickness of the coating layer is typically from 1 to 6 mm, preferably from 2 to 5 mm.

The adhesion layer preferably comprises the polymer composition, preferably the adhesive polymer composition according to the present invention.

The top coating layer preferably comprises a polyethylene resin, such as a HDPE resin or a crosslinked polyethylene resin, or a polypropylene resin After the coating the coated pipe is cooled, for instance by providing water flow on the coated pipe surface.

EXAMPLES

1. Measurement Methods a) Melt Flow Rate

The melt flow rate (MFR) is determined according to ISO 1133-1, method B and is indicated in g/10 min. The MFR is an indication of the flowability, and hence the processability, of the polymer. The higher the melt flow rate, the lower the viscosity of the polymer. The $MFR_2$ of polyethylene is measured at a temperature of 190° C. and a load of 2.16 kg.

b) Density

Density of the polymer was measured according to ISO 1183-1:2004 Method A on compression moulded specimen prepared according to EN ISO 1872-2 (February 2007) and is given in $kg/m^3$.

c) Peel Strength

Peel strength designates the relative strength of the bonding between epoxy layer and adhesive layer. The peel strength of the coating compositions was measured at 23° C. according to ISO 21809-1:2011 using a Zwick Roell tensile testing machine, with the following alterations to the method: The peel strength was recorded for three minutes, after which the mean value of the peel strength recorded over these three minutes was calculated. The mean value corresponds to the reported peel strength of the composition.

d) Melting Temperature Tm, Crystallization Temperature Tc

Melting temperature Tm, crystallization temperature Tc, and the degree of crystallinity were measured according to ISO 11357 with Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms.

e) GPC Measurement

A PL 220 (Agilent) GPC equipped with an infra-red detector (IR4 (PolymerChar, Spain), an online four capillary bridge viscometer (PL-BV 400-HT), and a dual light scattering detector (PL-LS 15/90 light scattering detector) with a 15° and 90° angle was used. 3×Olexis and 1×Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis.

All samples were prepared in the concentration range of 1.0-1.25 mg/ml and dissolved in 1,2,4-trichlorobenzene (TCB, stabilized with 250 mg/L 2,6-Di tert butyl-4-methylphenol) at 160° C. for 3 hours under continuous gentle shaking. The injected concentration of the polymer solution at 160° C. ($c_{160° C.}$) was adjusted for the volume expansion at 160° C. compared to 25° C. in the following way.

$$c_{160°C.} = \frac{w_{25}}{V_{25}} * 0,8772$$

with: $w_{25}$ (polymer weight) and $V_{25}$ (Volume of TCB at 25° C.).

Molecular Weight Averages, Polydispersity (Mn, Mw, Mz, MWD) by GPC-Conventional Analysis ($GPC_{conv}$)

For the GPC conventional ($GPC_{conv}$) approach the column set was calibrated using universal calibration (according to ISO 16014-2:2003) with 19 narrow MWD polystyrene (PS) standards in the range of 0.5 kg/mol to 11 500 kg/mol. The PS standards were dissolved at 160° C. for 15 min or alternatively at room temperatures at a concentration of 0.2 mg/ml for molecular weight higher and equal 899 kg/mol and at a concentration of 1 mg/ml for molecular weight below 899 kg/mol. The conversion of the polystyrene peak molecular weight to polyethylene molecular weights is accomplished by using the Mark Houwink equation and the following Mark Houwink constants:

$K_{PS}=19\times10^{-3}$ ml/g, $\alpha_{PS}=0.655$ $K_{PE}=39\times10^{-3}$ ml/g, $\alpha_{PE}=0.725$ A third order polynomial fit was used to fit the calibration data.

Molecular weight averages (Mz, Mw and Mn), Molecular weight distribution (MWD) and its broadness, described by polydispersity index, PD=Mw/Mn (wherein Mn is the number average molecular weight and Mw is the weight average molecular weight) were determined using the following formulas:

$$M_n = \frac{\sum_{i=1}^{N} A_i}{\sum (A_i/M_i)} \tag{1}$$

$$M_w = \frac{\sum_{i=1}^{N} (A_i \times M_i)}{\sum A_i} \tag{2}$$

$$M_z = \frac{\sum_{i=1}^{N} (A_i \times M_i^2)}{\sum (A_i/M_i)} \tag{3}$$

GPC-VISC-LS Analysis

For the GPC light scattering approach ($GPC_{LS}$) the inter detector delay volumes were determined with a narrow PS standard (MWD=1.01) with a molar mass of 130000 g/mol. The corresponding detector constants for the light scattering detector and the online viscometer were determined with the broad standard NIST1475A (Mw=52000 g/mol and IV=1.01 dl/g). The corresponding used dn/dc for the used PE standard in TCB was 0,094 cm³/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". As dn/dc used for the determination of molecular weight a value of 0.094 was used. This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, $2^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz(LS), Mw(LS) and Mn(LS)), Molecular weight distribution (MWD) and its broadness, described by polydispersity, PD(LS)=Mw(LS)/Mn(LS) (wherein Mn(LS) is the number average molecular weight and Mw(LS) is the weight average molecular weight obtained from GPC-LS) were calculated by Gel Permeation Chromatography (GPC) using the following formulas:

$$M_n(LS) = \frac{\sum_{i=1}^{N} A_i}{\sum (A_i/M_{i(LS)})} \tag{1}$$

$$M_w(LS) = \frac{\sum_{i=1}^{N} (A_i \times M_{i(LS)})}{\sum A_i} \tag{2}$$

$$M_z(LS) = \frac{\sum_{i=1}^{N} (A_i \times M_{i(LS)}^2)}{\sum (A_i/M_i(LS))} \tag{3}$$

For a constant elution volume interval $\Delta V_i$, where $A_i$ and $M_{i(LS)}$ are the chromatographic peak slice area and polyolefin molecular weight (MW) determined by GPC-LS.

For the molecular weight averages Mz, Mw and Mn the polyolefin molecular weight (MW) was determined by $GPC_{conv}$, where Mz(LS), Mw(LS) and Mn(LS) stands that this molecular weight averages were obtained by $GPC_{LS}$ approach.

CFLS Values

The cumulative fraction of the light scattering signal of the LS 15° angle (CFLS) is defined as the relative area above 10^6 (g/mol) or respectively above 2*10^6 (2M) and 3*10^6 (3M) g/mol to total area of the LS15 signal and is calculated in the following way from the normalized LS signal.

$$CFLS(1M) = \frac{\sum_{i=1M}^{n} LS(15)_i}{\sum_{i=1}^{n} LS(15)_i} * 100$$

$$CFLS(2M) = \frac{\sum_{i=2M}^{n} LS(15)_i}{\sum_{i=1}^{n} LS(15)_i} * 100$$

$$CFLS(3M) = \frac{\sum_{i=3M}^{n} LS(15)_i}{\sum_{i=1}^{n} LS(15)_i} * 100$$

where $LS(15)_i$ is the LS15 signal at the corresponded conventional molecular weight.

f) Comonomer Content

Quantitative Nuclear-Magnetic Resonance (NMR) Spectroscopy was Used to Quantify the 1-Butene and 1-Hexene Comonomer Content of the Ethylene-1-Butene-1 Hexene Terpolymer.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the bulk methylene signal (δ+) at 30.00 ppm {randall89}.

Characteristic signals corresponding to the incorporation of 1-butene were observed {randall89} and the comonomer fraction calculated as the fraction of 1-butene in the polymer with respect to all monomer in the polymer.

The amount of isolated 1-butene incorporated in EEBEE sequences was quantified using the integral of the *B2 sites $[I_{*B2}]$ at 39.8 ppm accounting for the number of reporting sites per comonomer:

$$B = I_{*B2}$$

With no other signals indicative of other comonomer sequences, i.e. consecutive comonomer incorporation observed, the total 1-butene comonomer content was calculated based solely on the amount of isolated 1-butene sequences:

$$B\text{total} = B$$

The total mole fraction of 1-butene in the polymer was then calculated as:

$$fB = B\text{total}/(E\text{total} + B\text{total} + H\text{total})$$

Characteristic signals corresponding to the incorporation of 1-hexene were observed {randall89} and the comonomer fraction calculated as the fraction of 1-hexene in the polymer with respect to all monomer in the polymer.

The amount isolated 1-hexene incorporated in EEHEE sequences was quantified using the integral of the *B4 sites $[I_{*B4}]$ at 38.2 ppm accounting for the number of reporting sites per comonomer:

$$H = I_{*B4}$$

With no other signals indicative of other comonomer sequences, i.e. consecutive comonomer incorporation observed, the total 1-hexene comonomer content was calculated based solely on the amount of isolated 1-hexene sequences:

$$H\text{total} = H$$

The total mole fraction of 1-hexene in the polymer was then calculated as:

$$fH = H\text{total}/(E\text{total} + B\text{total} + H\text{total})$$

The amount of ethylene was quantified using the integral of the bulk methylene (δ+) sites at 30.00 ppm. This integral included the γ site as well as the 3B4 sites from 1-hexene. The total ethylene content was calculated based on the bulk integral and compensating for the observed 1-butene and 1-hexene sequences and end-groups:

$$E = I_{\delta+}/2$$

Characteristic signals resulting from saturated end-groups were observed. The content of such saturated end-groups was quantified using the average of the integral of the signals at 22.8 $[I_{2S}]$ and 32.2 ppm $[I_{3S}]$ assigned to the 2s and 3s sites respectively:

$$S = (1/2)*(I_{2S} + I_{3S})$$

The presence of isolated comonomer units is corrected for based on the number of comonomer units and saturated end-groups present:

$$E\text{total} = E + (3/2)*B + (2/2)*H + (3/2)*S$$

The mole percent comonomer incorporation is calculated from the mole fraction:

$$B[\text{mol \%}] = 100*fB$$

$$H[\text{mol \%}] = 100*fH$$

The weight percent comonomer incorporation is calculated from the mole fraction:

$$B[\text{wt \%}] = 100*(fB*56.11)/((fB*56.11) + (fH*84.16) + ((1-(fB+fH))*28.05))$$

$$H[\text{wt \%}] = 100*(fH*84.16)/((fB*56.11) + (fH*84.16) + ((1-(fB+fH))*28.05))$$

randall89
J. Randall, Macromol. Sci., Rev. Macromol. Chem. Phys. 1989, C29, 201.

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373

Quantitative Nuclear-Magnetic Resonance (NMR) Spectroscopy was Used to Quantify the 1-Octene Comonomer Content of the Ethylene-1-Octene Copolymer and the Ethylene-1-Octene Elastomers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09, parkinson11}. Standard single-pulse excitation was employed utilising the transient NOE at short recycle delays of 3s {pollard04, klimke06} and the RS-HEPT decoupling scheme {fillip05,griffin07}. A total of 1024 (1 k) transients were acquired per spectrum.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}. Characteristic signals corresponding to the incorporation of 1-octene were observed (randall89, liu01, qiu07) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.3 ppm. This integral is assigned to the unresolved signals corresponding to both *B6 and *βB6B6 sites of isolated (EEOEE) and isolated double non-consecutive (EEOEOEE) 1-octene sequences respectively. To compensate for the influence of the two *βB6B6 sites the integral of the ββB6B6 site at 24.6 ppm is used:

$$O = I_{*B6+*\beta B6B6} - 2*I_{\beta\beta B6B6}$$

When characteristic signals resulting from consecutive 1-octene incorporation, i.e. EEOOEE comonomer sequences, were observed such consecutive 1-octene incorporation was quantified using the integral of the signal at 40.4 ppm assigned to the ααB6B6 sites accounting for the number of reporting sites per comonomer:

$$OO = 2*I_{\alpha\alpha B6B6}$$

When characteristic signals resulting from isolated non-consecutive 1-octene incorporation, i.e. EEOEOEE comonomer sequences, were observed such isolated non-consecutive 1-octene incorporation was quantified using the integral of the signal at 24.6 ppm assigned to the ββB6B6 sites accounting for the number of reporting sites per comonomer:

$$OEO = 2*I_{\beta\beta B6B6}$$

When characteristic signals resulting from isolated triple-consecutive 1-octene incorporation, i.e. EEOOOEE comonomer sequences, were observed such isolated triple-consecutive 1-octene incorporation was quantified using the integral of the signal at 41.2 ppm assigned to the αγγB6B6B6 sites accounting for the number of reporting sites per comonomer:

$$OOO = 3/2*I_{\alpha\gamma\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O+OO+OEO+OOO$$

Characteristic signals resulting from saturated end-groups were observed. Such saturated end-groups were quantified using the average integral of the two resolved signals at 22.9 and 32.23 ppm. The 22.84 ppm integral is assigned to the unresolved signals corresponding to both 2B6 and 2S sites of 1-octene and the saturated chain end respectively. The 32.2 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (\frac{1}{2})*(I_{2S+2B6}+I_{3S+3B6}-2*O_{total})$$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$$E_{total} = (\frac{1}{2})*[I_{bulk}+2*O+1*OO+3*OEO+0*OOO+3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = O_{total}/(E_{total}+O_{total})$$

The total comonomer incorporation of 1-octene in weight percent was calculated from the mole fraction in the standard manner:

$$O[\text{wt \%}] = 100*(fO*112.21)/((fO*112.21)+((1-fO)*28.05))$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.

parkinson11
NMR Spectroscopy of Polymers: Innovative Strategies for Complex Macromolecules, Chapter 24, 401 (2011)
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
randall89
J. Randall, Macromol. Sci., Rev. Macromol. Chem. Phys. 1989, C29, 201.
qui07
Qiu, X., Redwine, D., Gobbi, G., Nuamthanom, A., Rinaldi, P., Macromolecules 2007, 40, 6879
iu01
Liu, W., Rinaldi, P., McIntosh, L., Quirk, P., Macromolecules 2001, 34, 4757
Quantitative Nuclear-Magnetic Resonance (NMR) Spectroscopy was Used to Quantify the Acrylate Comonomer Content of the Ethylene Butyl Acrylate Elastomer.

Quantitative $^1$H NMR spectra recorded in the molten-state using a Bruker Avance III 500 NMR spectrometer operating at 500.13 MHz. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed using a recycle delay of 2s {pollard04, klimke06}. A total of 64 transients were acquired per spectra.

Quantitative $^1$H NMR spectra were processed, integrated and quantitative properties determined using custom spectral analysis automation programs. All chemical shifts were internally referenced to the bulk ethylene methylene signal at 1.33 ppm.

Assignment for butylacrylate (BA) incorporation {brandolini01}:

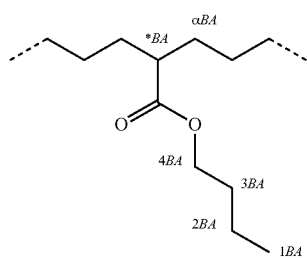

The butylacrylate (BA) incorporation was quantified using the integral of the signal at 4.06 ppm assigned to the 4BA sites, accounting for the number of reporting nuclei per comonomer:

$$BA=I_{4BA}/2$$

The ethylene content was quantified using the integral of the bulk aliphatic ($I_{bulk}$) signal between 0.00-3.00 ppm. This integral include 1BA (3), 2BA (2), 3BA (2), *BA (1) and αBA (2) sites from isolated butylacrylate incorporation as well as the sites from polyethylene sequences. The total ethylene content was calculated based on the bulk integral and compensating for the above mentioned BA sites:

$$E=(¼)*[I_{bulk}-10*BA]$$

The total mole fractions of butylacrylate (BA) in the polymer was calculated as:

$$fBA=BA/(E+BA)$$

The total comonomer incorporation of butylacrylate (BA) in mole percent was calculated from the mole fractions in the standard manner:

$$BA[mol \%]=100*fBA$$

The total comonomer incorporation of butylacrylate (BA) in weight percent was calculated from the mole fractions and molecular weight of the monomers in the standard manner:
BA [wt %]=100*(fBA*128.17)/((fBA*128.17)+((1−fBA)*28.05))
klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
castignolles09
Castignolles, P., Graf, R., Parkinson, M., Wilhelm, M., Gaborieau, M., Polymer 50 (2009) 2373
brandolini01
A. J. Brandolini, D. D. Hills, "NMR spectra of polymers and polymer additives", Marcel Deker Inc., 2000 g) Quantification of Unsaturations by NMR Spectroscopy

Quantitative nuclear-magnetic resonance (NMR) spectroscopy was used to quantify the content of unsaturated groups present in the polymers.

Quantitative $^1$H NMR spectra recorded in the solution-state using a Bruker Avance III 400 NMR spectrometer operating at 400.15 MHz. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups {he10a, busico05a}. All chemical shifts were indirectly referenced to TMS at 0.00 ppm using the signal resulting from the residual protonated solvent at 5.95 ppm.

Characteristic signals corresponding to the presence of terminal aliphatic vinyl groups (R—CH=CH$_2$) were observed and the amount quantified using the integral of the two coupled inequivalent terminal CH$_2$ protons (Va and Vb) at 4.95, 4.98 and 5.00 and 5.05 ppm accounting for the number of reporting sites per functional group:

Nvinyl=IVab/2

When characteristic signals corresponding to the presence of internal vinylidene groups (RR'C=CH$_2$) were observed the amount is quantified using the integral of the two CH$_2$ protons (D) at 4.74 ppm accounting for the number of reporting sites per functional group:

Nvinylidene=ID/2

When characteristic signals corresponding to the presence of internal cis-vinylene groups (E-RCH=CHR'), or related structure, were observed the amount was quantified using the integral of the two CH protons (C) at 5.39 ppm accounting for the number of reporting sites per functional group:

Ncis=IC/2

When characteristic signals corresponding to the presence of internal trans-vinylene groups (Z—RCH=CHR') were observed the amount was quantified using the integral of the two CH protons (T) at 5.45 ppm accounting for the number of reporting sites per functional group:

Ntrans=IT/2

When characteristic signals corresponding to the presence of internal trisubstituted-vinylene groups (RCH=CHR'R"), or related structure, were observed the amount was quantified using the integral of the CH proton (Tris) at 5.14 ppm accounting for the number of reporting sites per functional group:

Ntris=ITris

The Hostanox 03 stabiliser was quantified using the integral of multiplet from the aromatic protons (A) at 6.92, 6.91, 6.90 and at 6.89 ppm and accounting for the number of reporting sites per molecule:

H=IA/4

As is typical for unsaturation quantification in polyolefins the amount of unsaturation was determined with respect to total carbon atoms, even though quantified by $^1$H NMR spectroscopy. This allows direct comparison to other microstructure quantities derived directly from $^{13}$C NMR spectroscopy.

The total amount of carbon atoms was calculated from integral of the bulk aliphatic signal between 2.85 and −1.00 ppm with compensation for the methyl signals from the stabiliser and carbon atoms relating to unsaturated functionality not included by this region:

NCtotal=(Ibulk−42*H)/2+2*Nvinyl+2*Nvinylidene+ 2*Ncis+2*Ntrans+2*Ntris

The content of unsaturated groups (U) was calculated as the number of unsaturated groups in the polymer per thousand total carbons (kCHn):

U=1000*N/NCtotal

The total amount of unsaturated group was calculated as the sum of the individual observed unsaturated groups and thus also reported with respect per thousand total carbons:

Utotal=Uvinyl+Uvinylidene+Ucis+Utrans+Utris

The relative content of a specific unsaturated group (U) is reported as the fraction or percentage of a given unsaturated group with respect to the total amount of unsaturated groups:

[U]=Ux/Utotal he10a
He, Y., Qiu, X, and Zhou, Z., Mag. Res. Chem. 2010, 48, 537-542.
busico05a
Busico, V. et. al. Macromolecules, 2005, 38 (16), 6988-6996
h) Rheological Parameters The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \tag{1}$$

If the applied strain is within the linear viscoelastic regime, the resulting sinusoidal stress response can be given by $$\sigma(t)=\sigma_0 \sin(\omega t+\delta) \tag{2}$$

where $\sigma_0$, and $\gamma_0$ are the stress and strain amplitudes, respectively; $\omega$ is the angular frequency; $\delta$ is the phase shift (loss angle between applied strain and stress response); t is the time. Dynamic test results are typically expressed by means of several different rheological functions, namely the shear storage modulus, G', the shear loss modulus, G", the complex shear modulus, G*, the complex shear viscosity, $\eta$*, the dynamic shear viscosity, $\eta$', the out-of-phase component of the complex shear viscosity, $\eta$" and the loss tangent, tan $\eta$, which can be expressed as follows:

$$G' = \frac{\sigma_0}{\gamma_0} \cos \delta \, [\text{Pa}] \tag{3}$$

$$G'' = \frac{\sigma_0}{\gamma_0} \sin \delta \, [\text{Pa}] \tag{4}$$

$$G^* = G'+iG'' \, [\text{Pa}] \tag{5}$$

$$\eta^* = \eta' - i\eta'' \, [\text{Pa} \cdot \text{s}] \tag{6}$$

$$\eta' = \frac{G''}{\omega} \, [\text{Pa} \cdot \text{s}] \tag{7}$$

$$\eta'' = \frac{G'}{\omega} \, [\text{Pa} \cdot \text{s}] \tag{8}$$

The determination of so-called Shear Thinning Index, which correlates with MWD and is independent of Mw, is done as described in equation 9.

$$SHI_{(x/y)} = \frac{Eta^* \text{ for } (G^* = x \, \text{kPa})}{Eta^* \text{ for } (G^* = y \, \text{kPa})} \tag{9}$$

For example, the $SHI_{(2.7/210)}$ is defined by the value of the complex viscosity, in Pa s, determined for a value of G* equal to 2.7 kPa, divided by the value of the complex viscosity, in Pa s, determined for a value of G* equal to 210 kPa.

The $SHI_{(1/100)}$ is accordingly defined by the value of the complex viscosity, in Pa s, determined for a value of G* equal to 1 kPa, divided by the value of the complex viscosity, in Pa s, determined for a value of G* equal to 100 kPa.

The values of storage modulus (G'), loss modulus (G"), complex modulus (G*) and complex viscosity ($\eta^*$) were obtained as a function of frequency ($\omega$).

Thereby, e.g. $\eta^*_{300\ rad/s}$ (eta*$_{300\ rad/s}$) is used as abbreviation for the complex viscosity at the frequency of 300 rad/s and $\eta^*_{0.05\ rad/s}$ (eta*$_{0.05 rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $tan_{0.05}$ is used as abbreviation for the ratio of the loss modulus (G") and the storage modulus (G') at 0.05 rad/s and $tan_{300}$ is used as abbreviation for the ratio of the loss modulus (G") and the storage modulus (G') at 300 rad/s. The elasticity balance $tan_{0.05}/tan_{300}$ is defined as the ratio of the loss tangent $tan_{0.05}$ and the loss tangent $tan_{300}$.

Besides the above mentioned rheological functions one can also determine other rheological parameters such as the so-called elasticity index EI(x). The elasticity index Ei(x) is the value of the storage modulus, G' determined for a value of the loss modulus, G" of x kPa and can be described by equation 10.

$$EI(x) = G' \text{ for } (G''=x \text{ kPa})[Pa] \quad (10)$$

For example, the EI(5 kPa) is the defined by the value of the storage modulus G', determined for a value of G" equal to 5 kPa, the EI(2 kPa) is the defined by the value of the storage modulus G', determined for a value of G" equal to 2 kPa and the EI(0.5 kPa) is the defined by the value of the storage modulus G', determined for a value of G" equal to 0.5 kPa.

The polydispersity index, PI, is defined by equation 11.

$$PI = \frac{-10^5}{G'(\omega_{COP})}, \quad \omega_{COP} = \omega \text{ for } (G' = G'') \quad (11)$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol. 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

i) Dynamic Mechanical Thermal Analysis (DMTA)

The storage modulus G' and the glass transition temperature $T_g$ were measured by DMTA analysis. The DMTA evaluation and the storage modulus G' measurements were carried out in torsion mode on compression moulded samples at temperature between $-130°$ C. and $+150°$ C. using a heating rate of 2° C./min and a frequency of 1 Hz, according to ISO 6721-02 and ISO 6721-07. The measurements were carried out using an Anton Paar MCR 301 equipment. The compressed moulded samples have the following dimensions: 40×10×1 mm and are prepared in accordance to ISO 1872-2:2007. The storage modulus G'23 was measured at 23° C.

2. Components of the Polymer Composition

The following components were used for the production of the polymer compositions of the examples:

PE1:

A terpolymer of ethylene, 1-butene and 1-hexene was polymerized in a sequential multistage polymerization process of a loop reactor followed by a gas phase reactor using a single site catalyst prepared as follows:

130 grams of a metallocene complex bis(1-methyl-3-n-butylcyclopentadienyl) zirconium (IV) dichloride (CAS no. 151840-68-5), and 9.67 kg of a 30% solution of commercial methylalumoxane (MAO) in toluene were combined and 3.18 kg dry, purified toluene was added. The thus obtained complex solution was added onto 17 kg silica carrier Sylopol 55 SJ (supplied by Grace) by very slow uniform spraying over 2 hours. The temperature was kept below 30° C. The mixture was allowed to react for 3 hours after complex addition at 30° C. The loop reactor was operated at 85° C. temperature and 64 bar pressure. Into the reactor ethylene together with 1-butene comonomer and hydrogen and the catalyst were introduced so that the molar ratio of hydrogen to ethylene was 0.2 mol/kmol and the ratio of 1-butene to ethylene was 98.4 mol/kmol.

The slurry was withdrawn from the loop reactor intermittently by using settling legs and directed to a flash vessel operated at a temperature of 50° C. and a pressure of 3 bar. From there the polymer was directed to a gas phase reactor (GPR) operated at a pressure of 20 bar and a temperature of 75° C. Into the reactor ethylene together with 1-hexene comonomer and hydrogen were introduced so that the molar ratio of hydrogen to ethylene was 0.4 mol/kmol and the ratio of 1-hexene to ethylene was 12.2 mol/kmol.

The polymerization conditions and polymer properties of PE1 shown in Table 2 and 3 below.

PE2: A copolymer of ethylene and 1-octene was polymerized in a solution polymerization process using a Ziegler-Natta catalyst as described in Example III of WO 95/09191 A. The catalyst/donor feed inside the reactor (average) was BOMAG, SEAC, TBT The catalyst/donor feed inside the reactor (average) was BOMAG, SEAC, TBT, 2-chlorobutane and TEA as activator. The obtained copolymer has a density of 935 kg/m$^3$, a MFR$_2$ of 7.3 g/10 min, and a melting temperature, Tm, of 124° C.

The polymerization conditions and polymer properties are shown in Table 1 and 3 below.

Elastomer 1: Queo 6201LA-P, an ethylene-1-octene elastomer, commercially available from Borealis AG Elastomer 2: Engage 8842, an ethylene-1-octene elastomer, commercially available from Dow Corporate EBA An ethylene butyl acrylate elastomer, having a butyl acrylate content of 27% by weight a density of 927 kg/m$^3$ and an MFR$_2$ value of 4 g/10 min.

The properties of the elastomers 1, 2 and EBA are listed in Table 4 below.

MAH Maleic anhydride was used as acid grafting agent

PDX Perkadox 14S-fl, distributed by Akzo Nobel (10 wt % dissolved in isododecane) was used as radical initiator

TABLE 1

Polymerization conditions of PE2

| Polymerization Conditions: | PE2 |
|---|---|
| C(8-1)/C2 ratio [kg/kg] | 0.25 |
| Reactor temperature [° C.] | 200.0 |
| H2/C2 ratio [Nm$^3$/ton] | 0.75 |
| C2 conversion [%] | 95.00 |
| Exit temperature deep cooling [° C.] | −30.0 |
| Absorption ratio C6/C2 [kg/kg] | 4.6 |
| iPCl conc. in monomer stream [mg/l] | 2.5 |

TABLE 2

Polymerization conditions and properties of PE1

| Polymerization Conditions: | PE1 |
|---|---|
| Loop reactor | |
| Temperature [° C.] | 85 |
| Pressure [kPa] | 5316 |
| H2/C2 ratio [mol/kmol] | 0.2 |
| C4/C2 ratio [mol/kmol] | 98.4 |
| Split [%] | 41.6 |
| Density [kg/m$^3$] | 939 |
| MFR$_2$ [g/10 min] | 4.8 |
| Gas phase reactor | |
| Temperature [° C.] | 75 |
| Pressure [kPa] | 2000 |
| H2/C2 ratio [mol/kmol] | 0.4 |
| C6/C2 ratio [mol/kmol] | 12.2 |
| Split [%] | 58.4 |
| Density [kg/m$^3$] | 932 |
| MFR$_2$ [g/10 min] | 5.2 |

TABLE 3

Properties of PE1, PE2 and EBA

| Polymer Properties: | PE1 | PE2 |
|---|---|---|
| Density (kg/m$^3$) | 932 | 935 |
| MFR$_2$ [g/10 min] | 5.2 | 6.5 |
| Tm [° C.]/Hf [J/g] | 123.1/148 | 125.4/155 |
| Tc [° C.]/Hc [J/g] | 108.8/149 | 111.7/163 |
| Mn (LS) [g/mol] (GPC-VISC-LS) | 26,000 | 20,000 |
| Mw (LS) [g/mol] (GPC-VISC-LS) | 56,800 | 69,000 |
| Mz (LS) [g/mol] (GPC-VISC-LS) | 94,500 | 217,000 |
| PDI (Mw/Mn) (LS) (GPC-VISC-LS) | 2.2 | 3.5 |
| % C4 [wt %] | 0.6 | — |
| % C6 [wt %] | 2.7 | — |
| % C8 [wt %] | — | 3.5 |
| Vinyl groups/1000 C. [wt %] | 5.3 | 30.5 |
| Vinylidene groups/1000 C. [wt %] | 3.8 | 3.8 |

TABLE 3-continued

Properties of PE1, PE2 and EBA

| Polymer Properties: | PE1 | PE2 |
|---|---|---|
| Tri-substituted/1000 C. [wt %] | 6.3 | 0 |
| Cis-vinylene groups/1000 C. [wt %] | 0 | 0 |
| Trans-vinylene groups/1000 C. [wt %] | 2.0 | 0 |
| Total unsaturation/1000 C. [wt %] | 17.3 | 32.8 | n.d. = not determined

TABLE 4

Properties of elastomers 1 and 2 and EBA

| Polymer Properties: | Elastomer 1 | Elastomer 2 | EBA |
|---|---|---|---|
| Density (kg/m$^3$) | 862 | 857 | 926 |
| MFR$_2$ [g/10 min] | 1.0 | 1.0 | 3.9 |
| Mn (LS) [g/mol] (GPC-VISC-LS) | 60,000 | 80,000 | 16,000 |
| Mw (LS) [g/mol] (GPC-VISC-LS) | 126,000 | 138,000 | 195,000 |
| Mz (LS) [g/mol] (GPC-VISC-LS) | 202,000 | 203,000 | 1,160,000 |
| PDI (Mw/Mn) (LS) (GPC-VISC-LS) | 2.1 | 1.7 | 12.3 |
| % C8 [wt %] | 38.0 | 39.8 | — |
| % BA [wt %] | — | — | 25.7 |
| Vinyl groups/1000 C. [wt %] | 12.4 | 5.4 | 9.3 |
| Vinylidene groups/1000 C. [wt %] | 16.6 | 0.9 | 29.2 |
| Tri-substituted/1000 C. [wt %] | 21.6 | 0 | 0 |
| Cis-vinylene groups/1000 C. [wt %] | 7.7 | combined | 0 |
| Trans-vinylene groups/1000 C. [wt %] | 4.0 | 1.7 | 0 |
| Total unsaturation/1000 C. [wt %] | 62.1 | 7.9 | 38.5 |

The following feeds of the above listed components as listed in Table 5 were used for production of the adhesive polymer components of the examples:

TABLE 5

Feeds for producing the polymer compositions of the examples

| | CE1 | IE1 | IE2 | CE2 | IE3 | IE4 | IE5 | CE3 | IE6 |
|---|---|---|---|---|---|---|---|---|---|
| PE1 [wt %] | 73.8 | 73.8 | 73.8 | — | — | — | — | — | — |
| PE2 [wt %] | — | — | — | 73.8 | 73.8 | 73.8 | 73.8 | 73.8 | 73.8 |
| Elastomer 1 [wt %] | — | 26.0 | — | — | 26.0 | 26.0 | — | — | 26.0 |
| Elastomer 2 [wt %] | — | — | 26.0 | — | — | — | 26.0 | — | — |
| EBA [wt %] | 26.0 | — | — | 26.0 | — | — | — | 26.0 | — |
| MAH [wt %] | 0.2 | 0.2 | 0.2 | 0.2 | 0.2 | 0.2 | 0.2 | 0.2 | 0.2 |
| POX solution feed [g/min] | 0.7 | 0.5 | 0.6 | 0.7 | 0.5 | 0.6 | 0.5 | 0.6 | 0.4 |

3. Compounding and Grafting of the Polymer Compositions of the Examples

The polymer compositions of the examples were compounded and grafted in a Werner & Pfleiderer ZSK 30 co-rotating twin-screw extruder having a L/D of 38 with 6 temperature control sections.

Inventive examples IE1 to IE5 and comparative examples CE1 and CE2 were compounded with a constant temperature profile in the control zones of about 200° C. over control zones 2-6 and the die plate, starting with a temperature of 180° C. in control zone.

Inventive example IE6 and comparative example CE3 were compounded with an increased temperature profile in the control zones of the extruder starting at a lower temperature of 160° C. in control zone 1 and an incremental increase of the temperature up to 200° C. in control zone 4. The temperature was then slightly increased in the following control zones to a temperature of 210° C. in control zone 6 and the die plate.

Inventive example IE4 is a repeat of inventive example IE3 with the only difference being a lower screw speed of 200 rpm compared to 230 rpm for better comparison with IE6 and CE3 which also were compounded using a screw speed of 200 rpm.

The following compounding conditions were used for the examples and the following properties were of the resultant adhesive polyethylene compositions were obtained as listed below in Table 6.

Figure 2:
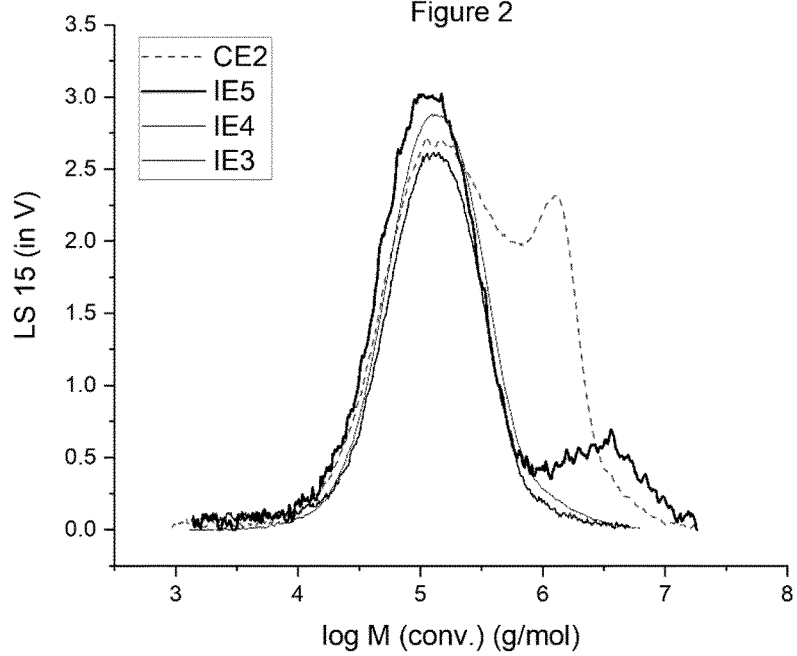
FIG. 2 shows a comparison of the GPC curve in a graph of the normalized LS 15 concentration over the log M of examples CE2, IE3, IE4 and IE5.
Figure 3:
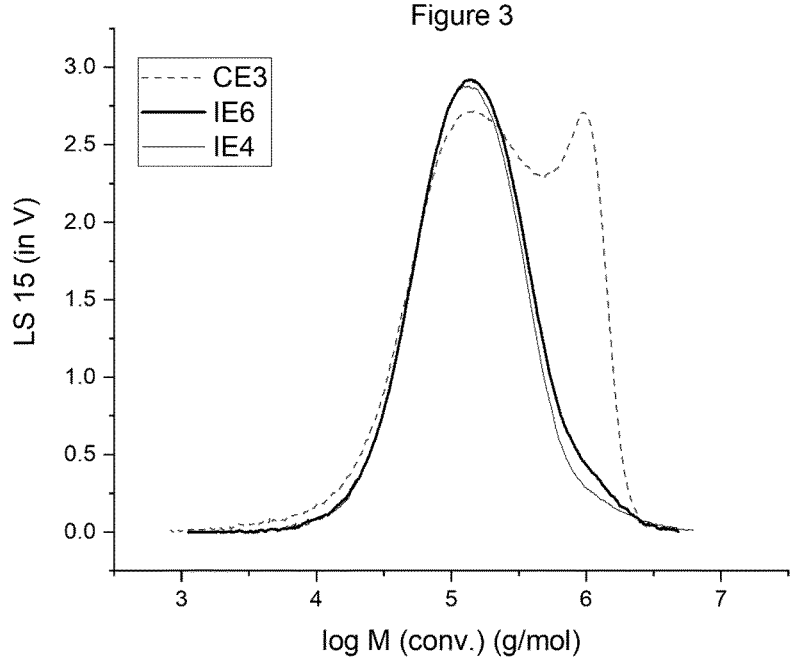
FIG. 3 shows a comparison of the GPC curve in a graph of the normalized LS 15 concentration over the log M of examples CE3, IE4 and IE6.

The polymer compositions of examples CE1-3, and IE1-6 prepared above were subjected to GPC measurements and GPC-VISC-LS analysis. FIG. 1 shows the LS 15 signal obtained from the GPC-VISC-LS analysis of examples CE1, IE1 and IE2. FIG. 2 shows the LS 15 signal obtained from the GPC-VISC-LS analysis of examples CE2, IE3, IE4 and IE5. FIG. 3 shows the LS 15 signal obtained from the GPC-VISC-LS analysis of examples CE3, IE6 and IE4.

From all figures it can be observed that in general the inventive examples including the ethylene based elastomer differ from the comparative examples including the polar elastomer in only exhibiting one distinct peak.

In FIG. 1 the GPC data examples IE1, IE2 and CE1 are shown, which all include the ethylene-1-octene non-elastomeric copolymer PE2. Inventive examples IE1 and IE2 differ in their ethylene based plastomer but show comparable GPC curves with one distinct peak compared to the two distinct peaks of CE1.

In FIG. 2 the GPC data examples IE3, IE4, IE5 and CE2 are shown, which all include the ethylene-1-butene-1-hexene non-elastomeric terpolymer PE1. The inventive examples also show one distinct peak compared to the two distinct peaks of CE2. IE3 and IE4 have the same composition including plastomer 1 and grafting process and only differ in their screw speed. These examples show comparable GPC curves. IE5 differs from IE3 and IE4 in comprising plastomer 2 and a distinct tail at high molecular weights in the GPC curve which mainly translates to higher Mz values.

In FIG. 3 the GPC data of examples prepared using the increased temperature profile (IE6, CE3) are compared with inventive example IE4, which differs from IE6 only in being prepared using the constant temperature profile. As main difference a slight shoulder at high molecular weights can be observed for IE6 which mainly translates to higher Mz values. Again the inventive examples including the ethylene based elastomer differ from the comparative example CE3 in only exhibiting one distinct peak.

The molecular weights of Mw, Mn, Mz and PDI (Mw/Mn) are listed in Table 6 below.

TABLE 6

Compounding conditions and properties of the compositions

| | CE1 | IE1 | IE2 | CE2 | IE3 | IE4 | IE5 | CE3 | IE6 |
|---|---|---|---|---|---|---|---|---|---|
| Compounding conditions: | | | | | | | | | |
| Throughput [kg/h] | 8 | 8 | 8 | 8 | 6 | 7 | 6 | 8 | 6 |
| Screw speed [rpm] | 200 | 200 | 200 | 230 | 230 | 200 | 230 | 200 | 200 |
| Melt temp. (die) [° C.] | 215 | 215 | 215 | 216 | 216 | 218 | 215 | 228 | 226 |
| Melt pressure (die) [bar] | 22 | 23-26 | 24-25 | 25-28 | 23-26 | 27-29 | 23-27 | 23-28 | 23-26 |
| Torque [%] | 77 | 86-87 | 88-91 | 90-93 | 89-91 | 98 | 90-93 | 93-96 | 98-100 |
| Temperature feeding zone [° C.] | <40 | <40 | <40 | <40 | <40 | <40 | <40 | <40 | <40 |
| Temperature control zone 1 [° C.] | 180 | 181 | 180 | 180 | 180 | 180 | 180 | 160 | 160 |
| Temperature control zone 2 [° C.] | 200 | 200 | 200 | 199 | 199 | 200 | 201 | 170 | 170 |
| Temperature control zone 3 [° C.] | 200 | 199 | 198 | 198 | 198 | 202 | 201 | 180 | 181 |
| Temperature control zone 4 [° C.] | 200 | 200 | 200 | 200 | 200 | 200 | 200 | 200 | 200 |
| Temperature control zone 5 [° C.] | 200 | 200 | 198 | 199 | 201 | 199 | 201 | 200 | 199 |
| Temperature control zone 6 [° C.] | 200 | 201 | 201 | 201 | 202 | 198 | 197 | 210 | 210 |
| Temperature die plate [° C.] | 200 | 200 | 200 | 200 | 200 | 200 | 200 | 210 | 210 |
| Properties | | | | | | | | | |
| MFR$_2$ (comp. composition) [g/10 min] | 1.29 | 1.20 | 1.20 | 1.16 | 1.16 | 1.21 | 1.16 | 1.26 | 1.26 |
| Density [kg/m$^3$] | n.d. | n.d. | n.d. | 931 | n.d. | n.d. | 913.8 | n.d. | n.d. |
| Tm [° C.] | 124.2 | 124.5 | 124.6 | 122.7 | 123.4 | 122.6 | 123.0 | 122.3 | 123.3 |
| Hf [J/g] | 118 | 109 | 111 | 107 | 106 | 104 | 108 | 109 | 104 |
| Tc [° C.] | 111.6 | 113.3 | 113.4 | 109.0 | 110.9 | 111.4 | 111.3 | 109.4 | 111.1 |
| Hc [J/g] | 127 | 112 | 115 | 114 | 112 | 109 | 112 | 116 | 109 |
| Mw (LS) [g/mol] (GPC-VISC-LS) | 115,000 | 95,000 | 94,000 | 121,000 | 86,000 | 98,000 | 106,000 | 126,000 | 108,000 |
| Mn (LS) [g/mol] (GPC-VISC-LS) | 20,000 | 26,000 | 28,000 | 22,000 | 29,000 | 33,000 | 36,000 | 26,000 | 32,000 |
| Mz (LS) [g/mol] (GPC-VISC-LS) | 491,000 | 248,000 | 226,000 | 813,000 | 195,000 | 218,000 | 341,000 | 441,000 | 547,000 |
| PDI (Mw/Mn) (LS) (GPC-VISC-LS) | 5.7 | 3.7 | 3.4 | 5.6 | 3.0 | 3.0 | 3.0 | 4.8 | 3.4 |
| PI [s$^{-1}$] | 1.53 | 1.75 | 1.54 | 0.89 | 0.91 | 0.74 | 0.76 | 0.90 | 0.71 |
| SHI$_{1/100}$ | 22.3 | 16.9 | 15.4 | 12.5 | 11.0 | 8.9 | 9.5 | 12.2 | 8.3 |
| EI (0.5 kPa) [Pa] | 332 | 199 | 227 | 346 | 155 | 141 | 205 | 357 | 149 |
| EI (2 kPa) [Pa] | 1225 | 1042 | 1025 | 1068 | 840 | 779 | 861 | 1074 | 765 |
| EI (5 kPa) [Pa] | 3336 | 3114 | 2991 | 2824 | 2597 | 2451 | 2540 | 2802 | 2375 |
| Tg [° C.] | −44.0 | −52.0 | −54.0 | −44.1 | −51.8 | −50.7 | −53.7 | −45.1 | −50.3 |
| G' (23° C.) [MPa] | 228 | 199 | 195 | 214 | 182 | 175 | 197 | 192 | 177 |
| CFLS-1M (fraction above 1 * 10$^6$ MW) | 11.6 | 3.2 | 2.9 | 17.5 | 1.3 | 3.2 | 10.8 | 11.9 | 3.7 |
| CFLS-2M (fraction above 2 * 10$^6$ MW) | 0.2 | 0 | 0 | 4.7 | 0.6 | 0.8 | 7.1 | 0.6 | 1.0 |
| CFLS-3M (fraction above 3 * 10$^6$ MW) | 0 | 0 | 0 | 1.9 | 0.2 | 0.4 | 4.1 | n.d. | n.d. |
| Vinyl groups/1000 C. [wt %] | 21.8 | 20.3 | 19.3 | 5.2 | 4.9 | 5.3 | 3.2 | 5.2 | 5.1 |

TABLE 6-continued

Compounding conditions and properties of the compositions

|  | CE1 | IE1 | IE2 | CE2 | IE3 | IE4 | IE5 | CE3 | IE6 |
|---|---|---|---|---|---|---|---|---|---|
| Vinylidene groups/1000 C. [wt %] | 8.4 | 5.8 | 2.0 | 9.5 | 5.1 | 6.2 | 3.0 | 9.0 | 7.3 |
| Tri-substituted/1000 C. [wt %] | 0 | 6.2 | 0 | 3.4 | 9.6 | 8.0 | 4.2 | 4.1 | 9.3 |
| Cis-vinylene groups/1000 C. [wt %] | 0 | 0 | 0 | 2.3 | 0 | 0 | 2.1 | 0 | 0 |
| Trans-vinylene groups/1000 C. [wt %] | 2.8 | 2.0 | 1.5 | 2.7 | 2.2 | 2.0 | 2.8 | 2.3 | 2.0 |
| Total unsaturation/1000 C. [wt %] | 33.0 | 34.3 | 22.8 | 23.1 | 21.9 | 21.6 | 15.2 | 20.6 | 23.6 | n.d. = not determined

4. Pipe Coating

The polymer compositions prepared as described above were used as adhesive polymer compositions in adhesive layers in a three-layer pipe coating.

First, steel pipes with a diameter of 114.3 mm and a wall thickness of 5 mm were heated in a rotating steel pipe line with a line speed of 9 m/min set to a temperature of 200-220° C. and were sprayed with epoxy powder as corrosion protection.

Subsequently, the polymer compositions prepared above and a conventional high density polyethylene were co-extruded onto the epoxy layer as adhesive layer and outer protection layer. The co-extrusion was performed with a KM-45 single screw extruder for the high density polyethylene topcoat and an Extron 50 single screw extruder for the polymer compositions prepared above. The temperature at the die of the extrusion of the polymer compositions was 215° C. The temperature at the die of the extrusion of the high density polyethylene composition was 215° C.

The following layer thicknesses were targeted:
Epoxy layer: 150 μm
Adhesive layer: 480 μm
Protective outer layer: 4.2 mm
Both the adhesive layer and the protective outer layer were rolled tightly onto the coating surface with a silicone pressure roller.

The coated pipes were subjected to a two different cooling procedures as described below in Table 7.

TABLE 7

Cooling procedures

|  | Normal cooling | Short cooling |
|---|---|---|
| Epoxy layer on hot steel pipe | 190° C. | 190° C. |
| Adhesive layer on epoxy layer | 225° C. | 225° C. |
| Outer layer on adhesive layer | 250° C. | 250° C. |
| Water cooling | until 40° C. | until 85° C. |
| Cooling in ambient air | until 23° C. | until 23° C. |

In both cooling procedures the coated pipe is subjected to a water cooling step in which the pipe is cooled in a water spray chamber until a target temperature of about 40° C. for normal cooling and about 85° C. for short cooling is obtained. Compared to the normal cooling procedure in the short cooling procedure the water cooling step is significantly shortened until the pipe reaches a temperature of about 85° C. instead of about 40° C. of the normal cooling procedure in order to simulate faster line speeds through the cooling bath. The coated pipe is instead removed from the water spray chamber and left to cool down from about 80° C. to about 23° C. in ambient air, which takes about 90-120 minutes. In the normal cooling step the pipe, which is cooled down in the water cooling step to a temperature of about 40° C. is also removed from the water spray chamber and left to cool down from about 40° C. to about 23° C. in ambient air.

After cooling the pipe coatings were subjected to peel strength tests at 23° C. and 80° C. The results are shown below in Table 8.

TABLE 8

Peel strength of the pipe coatings

|  | Peel strength (23° C.), normal cooling [N/cm] | Peel strength (23° C.), short cooling [N/cm] | Peel strength (80° C.), normal cooling [N/cm] | Peel strength (80° C.), short cooling [N/cm] |
|---|---|---|---|---|
| CE1 | 482 | 224 | 175 | 105 |
| IE1 | 499 | 464 | 98 | 67 |
| IE2 | 487 | 478 | 121 | 111 |
| CE2 | 655 | 305 | 238 | 124 |
| IE3 | 551 | 586 | 175 | 100 |
| IE4 | 596 | 590 | 194 | 114 |
| IE5 | 641 | 632 | 209 | 198 |
| CE3 | 586 | 531 | 283 | 197 |
| IE6 | 579 | 627 | 168 | 181 |

It can be seen that the coating including adhesive layers made from the polymer compositions according to the present invention IE1 to IE6 all show a higher peel strength after the short cooling procedure at 23° C. compared to the coatings including adhesive layers made from the comparative polymer compositions CE1 to CE3 using EBA instead of the ethylene based elastomer.

Inventive examples IE3-IE6 using the ethylene-1-butene-1-hexene terpolymer as non-elastomeric polyethylene thereby show further improved peel strength properties under all conditions after the normal and the short cooling procedure at 23° C. and 80° C. compared to inventive examples IE1 and IE2 using the ethylene-1-octene copolymer as non-elastomeric polyethylene.

The use of elastomer 2 used in inventive examples IE2 and IE5 thereby has a superior influence on the peel strength especially after the short cooling procedure at 23° C. and 80° C. compared to elastomer 1 used in inventive examples IE1, IE3 and IE4.

The grafting procedure using the increased temperature profile in the barrel section of the extruder (IE6) leads to an improved peel strength after the short cooling procedure at 80° C. compared to the grafting procedure using the constant temperature profile in the barrel section of the extruder (IE4).

The invention claimed is:
1. An adhesive polyethylene composition comprising
(A) from 60 to 90 wt % of a non-elastomeric polyethylene;
(B) from 9.0 to 38 wt % of an ethylene based elastomer being a copolymer of ethylene and alpha-olefin comonomer units having from 4 to 12 carbon atoms, which has a density in the range of from 840 to 900 kg/m³;

wherein onto components (A) and (B) an acid grafting agent (C) has been grafted in an amount of from 0.01 to 3.0 wt %, all based on the total weight of the adhesive polyethylene composition.

2. The adhesive polyethylene composition according to claim 1, wherein the non-elastomeric polyethylene (A) is a copolymer of ethylene and one or more comonomer units selected from alpha-olefins having from 4 to 12 carbon atoms.

3. The adhesive polyethylene composition according to claim 1, wherein the acid grafting agent (C) is selected from unsaturated carboxylic acids or derivatives thereof.

4. The adhesive polyethylene composition according to claim 1, having a polydispersity index PDI (LS), being the ratio of Mw/Mn of from 1.5 to 4.5, determined by GPC-VISC-LS analysis.

5. The adhesive polyethylene composition according to claim 1, having an elasticity index at a loss modulus $G''=0.5$ kPa EI(0.5 kPa) of from 75 to 320 Pa.

6. The adhesive polyethylene composition according to claim 1, having only one peak in the GPC curve, which is defined below in the measurement methods as the concentration normalized LS 15 signal along the molecular weight of conventional GPC, obtained from the GPC-VISC-LS analysis.

7. The adhesive polyethylene composition according to claim 2, wherein the non-elastomeric polyethylene (A) is a copolymer of ethylene and one single comonomer selected from alpha-olefins having from 4 to 12 carbon atoms.

8. The adhesive polyethylene composition according to claim 2, wherein the non-elastomeric polyethylene (A) is a terpolymer of ethylene and two comonomers selected from alpha-olefins having from 4 to 12 carbon atoms.

9. The adhesive polyethylene composition according to claim 1, obtained from a process comprising the steps of:

feeding components (A), (B) and (C) into an extruder into the feeding section of an extruder comprising a feeding section, a barrel section and a die plate, wherein the barrel section of the extruder downstream of the feeding section and upstream of the die plate is divided into a plurality of control zones, and the first control zone represents the first control zone within the barrel section downstream of the feeding zone in which the fed component(s) (A) and/or (B) start(s) to melt;

compounding the components (A) and (B) in the extruder in order to form the adhesive polyethylene composition; and grafting components (A) and (B) with component (C) during the compounding step.

10. The adhesive polyethylene composition according to claim 9, wherein the temperature of the second to the last control zone in the barrel section is maintained constant over all of these control zones with a total deviation of not more than 20° C.

11. The adhesive polyethylene composition according to claim 9, wherein the process further comprises the step of:

independently controlling the temperature of each control zone of the plurality of control zones of the barrel section of the extruder as such that a) the temperature in the first control zone of the barrel section downstream of the feeding section is in the range of from higher than 85° C. to 180° C., b) the temperature of the control zones of the barrel section from the first control zone of the barrel section downstream the feeding section to the control zone in the middle of the barrel section is increased over the length of the barrel section in two or more steps so that the temperature of the control zone in the middle of the barrel section is from 105% to 145% of the temperature in the first control zone of the barrel section downstream of the feeding section; and c) the temperature of the control zones of the barrel section from control zone in the middle of the barrel section to the control zone of the barrel section directly upstream of the die plate in maintained at the same temperature or increased to a temperature of not more than 120% of the temperature of the control zone in the middle of the barrel section.

12. A multi-layer structure comprising one layer comprising the adhesive polyethylene composition according to claim 1.

13. The multi-layer structure according to claim 12, being a three-layer coating of a metal pipe.

14. The multi-layer structure according to claim 12, having a peel strength at 23° C. of at least 350 N/cm and/or a peel strength at 80° C. of at least 60 N/cm.

* * * * *